(12) United States Patent
Roberts et al.

(10) Patent No.: US 6,233,010 B1
(45) Date of Patent: *May 15, 2001

(54) ELECTRONIC STILL VIDEO CAMERA WITH DIRECT PERSONAL COMPUTER (PC) COMPATIBLE DIGITAL FORMAT OUTPUT

(75) Inventors: Marc K. Roberts, Burke; Matthew A. Chikosky, Springfield; Jerry A. Speasl, Vienna, all of VA (US)

(73) Assignee: St. Clair Intellectual Property Consultants, Inc., Grosse Pointe, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/253,831

(22) Filed: Feb. 19, 1999

Related U.S. Application Data

(63) Continuation of application No. 08/712,493, filed on Sep. 11, 1996, which is a continuation of application No. 08/098,787, filed on Jul. 29, 1993, now Pat. No. 5,576,757, which is a continuation of application No. 07/878,603, filed on May 5, 1992, now abandoned, which is a continuation of application No. 07/615,848, filed on Nov. 20, 1990, now Pat. No. 5,138,459.

(51) Int. Cl.[7] ................................................. H04N 5/225
(52) U.S. Cl. .......................................... 348/220; 348/207

(58) Field of Search ..................................... 348/207, 220, 348/221, 222, 230, 232, 233, 239; 358/909, 906.1; H04N 5/225

(56) References Cited

U.S. PATENT DOCUMENTS

| | | | | |
|---|---|---|---|---|
| 4,758,883 | * | 7/1988 | Kawahara et al. | 348/231 |
| 5,016,107 | * | 5/1991 | Sassonet et al. | 348/231 |
| 5,034,804 | * | 7/1991 | Sasaki et al. | 348/231 |
| 5,153,730 | * | 10/1992 | Nagasaki et al. | 348/231 |

FOREIGN PATENT DOCUMENTS

| | | |
|---|---|---|
| 63-284987 | 5/1987 | (JP) . |
| 2-125572 | 11/1988 | (JP) . |
| 1-114286 | 5/1989 | (JP) . |
| 1-248785 | 10/1989 | (JP) . |
| 2-146874 | 6/1990 | (JP) . |
| 2-202782 | 8/1990 | (JP) . |
| 2-208779 | 8/1990 | (JP) . |
| 2-222385 | 9/1990 | (JP) . |
| 2-257780 | 10/1990 | (JP) . |

* cited by examiner

*Primary Examiner*—Tuan Ho
(74) *Attorney, Agent, or Firm*—Harness, Dickey & Pierce, P.L.C.

(57) ABSTRACT

A digital camera includes a digital memory system having a control unit for checking for proper format initialization of a removable digital memory element and for performing format initialization of the memory element when necessary

1 Claim, 11 Drawing Sheets

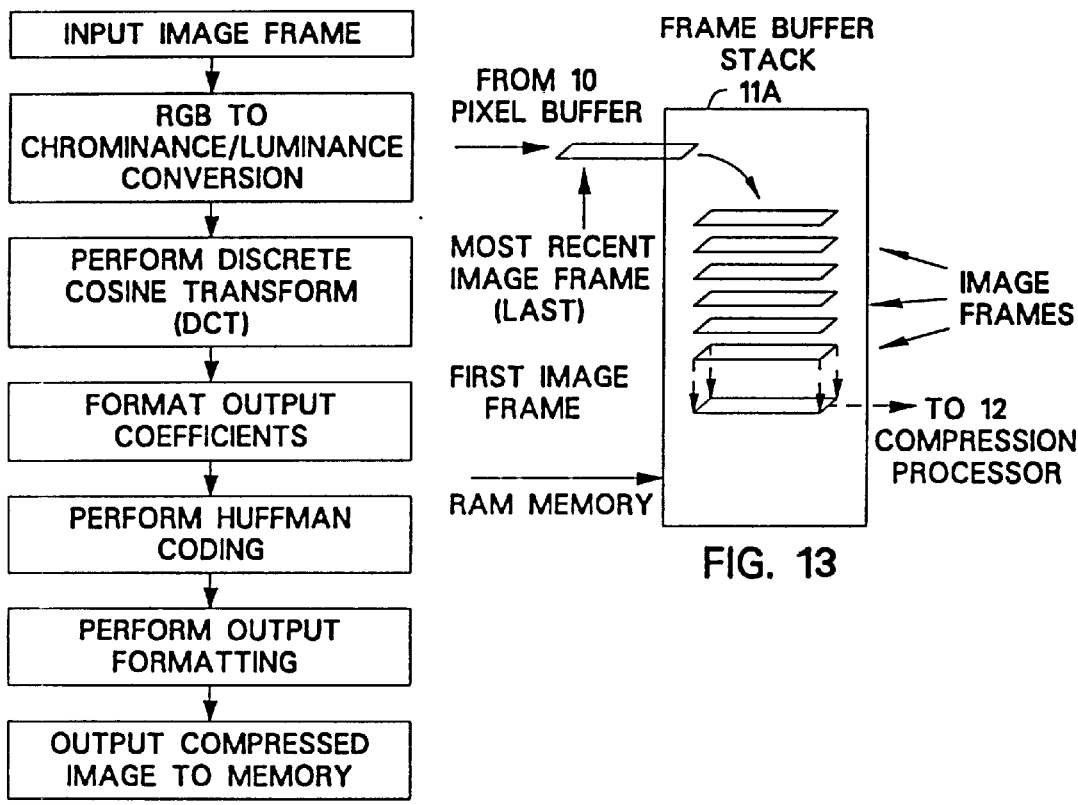
FIG. 8
FIG. 13
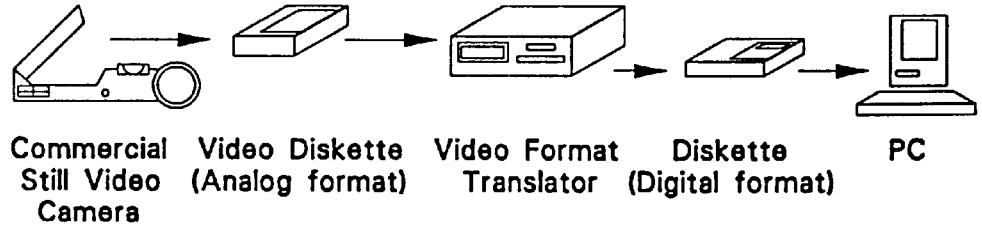
FIG. 10

ELECTRONIC STILL VIDEO CAMERA WITH DIRECT PERSONAL COMPUTER (PC) COMPATIBLE DIGITAL FORMAT OUTPUT

This is a continuation of U.S. patent application Ser. No. 08/712,493, filed Sep. 11, 1996, which is a continuation of U.S. patent application Ser. No. 08/098,787, filed Jul. 29, 1993, now U.S. Pat. No. 5,576,757, which is a continuation of U.S. patent application Ser. No. 07/878,603, filed May 5, 1992, now abandoned, which is a continuation of U.S. patent application Ser. No. 07/615,848, filed Nov. 20, 1990 and now U.S. Pat. No. 5,138,459.

BACKGROUND OF THE INVENTION

1. Field of the Invention

This invention generally relates to an electronic still video camera and in particular to an improved electronic still camera which converts a still picture of an object or scene into an operator selectable compressed digital signal format for storage utilizing a compression/decompression algorithm, such as the Joint Photographic Experts Group (JPEG) algorithm standard for example, formatted into Personal Computer (PC) compatible format retaining the images' color information, and stored on a PC compatible memory diskette. For example, the diskette can be a three and a half (3½) inch digital diskette. The digital diskette is removeable from the electronic camera for direct insertion into a PC which contains the previously loaded corresponding decompression algorithm whereby the digital image is in a format compatible for immediate use with word processing, desk top publishing, data base, and multi-media applications.

2. Description of the Prior Art

FIG. 1 is a schematic block diagram showing structure of a conventional prior art electronic still camera system, in which a CCD image sensor element 1a converts a still image of an object into an analog color video signal when the shutter control circuitry 2a is activated. The output color video signal of the image sensor element is then routed to the signal processing subsystem 3a where the signal is converted to National Television System Committee (NTSC) or other composite video formats (such as the European video standard Phase Alternating Line-PAL) and logged in analog format onto a mass memory storage device such as an analog video floppy disk, Electrically Erasable Programmable Read Only Memory (EEPROM), analog audio cassette, bubble memory, or other storage device 5a. Power is supplied by a rechargeable/removeable battery system 4a.

An electronic camera that converts an image into electronic image signals and transferred to a memory storage device is disclosed in the following: U.S. Pat. No. 4,131,919; U.S. Pat. No. 4,456,931; U.S. Pat. No. 4,758,883; U.S. Pat. No. 4,803,554; and U.S. Pat. No. 4,837,628.

Conventional prior art electronic still cameras, for example of the types disclosed in the aforementioned references, produce an electronic signal corresponding to a desired image in analog format such as the National Television System Committee (NTSC) or similar on magnetic or electronic storage media for either permanent or temporary storage to facilitate viewing on a television or video monitor. With the current state of the art, it is expensive and time consuming to convert the analog image equivalent to a digital format for direct utilization with PC software applications. Currently, to convert an image captured on an electronic still camera to a PC compatible format one must convert the signal back to either a composite NTSC or RGB video signal and use a conversion device such as a "frame grabber" (a digital circuit board installed into PCs that convert video images into PC compatible formats) of the type sold commercially by Aapps Corporation, Orange Micro, RasterOps, and others or convert the image to a hard-copy print (a photograph) and utilize an electronic "scanner", a piece of equipment that connects to a PC, which converts an image into a digital format. The later technique is employed extensively within the desktop publishing industry.

SUMMARY OF THE INVENTION

It is the object of this invention to provide an improved electronic still camera with operator selectable picture compression in one of a plurality of operator selectable digital data formats recordable on a standard removeable magnetic diskette common to personal computers.

It is a further object of this invention to provide an improved electronic still camera that provides digital image files for immediate and direct incorporation into popular word processing, desktop publishing, and other software programs on PCs.

It is another object of this invention is to provide an improved electronic still camera that, under user selection, can record and store still images selectively compressed in a directly insertable digital memory storage device into a PC in either color or black and white formats thus facilitating storage of a large number of images with the signal flag indicating the degree of compression selected by the operator as well as the color/black and white mode selection being stored as digital values on the digital memory storage device with each image frame.

An additional object of this invention to provide an electronic still camera device that can rapidly capture a series of images automatically as well as singularly. Also, this camera provides multiple outputs in both video format for monitor and display of images and digital formats to facilitate data transmission, additional processing, or storage to a variety of storage media.

It is still another object of this invention is to provide a more efficient electronic still camera that can take a still picture with operator selectable high, medium, or low resolution in either color or black and white by electronic shutter and exposure control by utilizing a variety of electro-optical sensors including Charge Coupled Devices (CCD), Infrared (IR), and Ultra Violet (UV) which can be directly or remotely controlled by analog, digital, or radio frequency (RF) control signals.

A further object of this invention is to provide a programmable video picture translator device for efficiently converting electronic still images in analog composite video format into digital data format readable by a PC. This translator device also provides additional video inputs and outputs for capturing video images, monitoring video images on monitors and displays, and can transmit either compressed or unprocessed digital image data through a variety of output I/O channels in various formats such as serial, parallel, etc. Also, this invention can incorporate sound/voice with images thru additional interface circuitry and audio digitizers.

Finally, it is the object of this invention to provide an electronic still camera that is efficient in design and permits extended periods of portable operation and which provides the user with operational status through the use of continuous internal self-test software routines and operator displays.

BRIEF DESCRIPTION OF THE DRAWINGS

FIG. 8 is a flowchart showing the steps of the image compression algorithm in accordance with one aspect of the present invention.

FIG. 10 is a block diagram illustrating the operation of a translator device in accordance with one aspect of the present invention.

FIG. 13 is an alternate embodiment of a frame buffer utilizable in accordance with another aspect of the present invention showing a frame buffer stack permitting multiple shot mode.

DESCRIPTION OF THE PREFERRED EMBODIMENT

Figure 1:
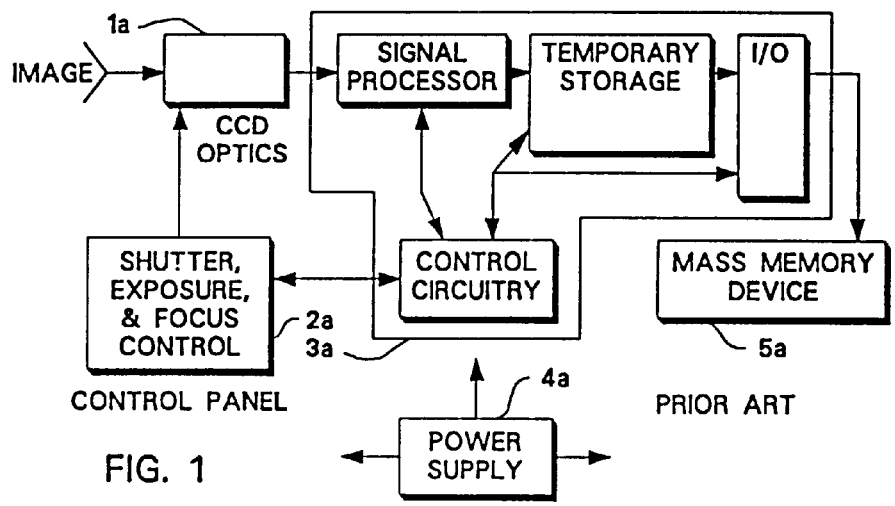
FIG. 1 is a schematic block diagram of a conventional prior art electronic still camera.
Figure 2:
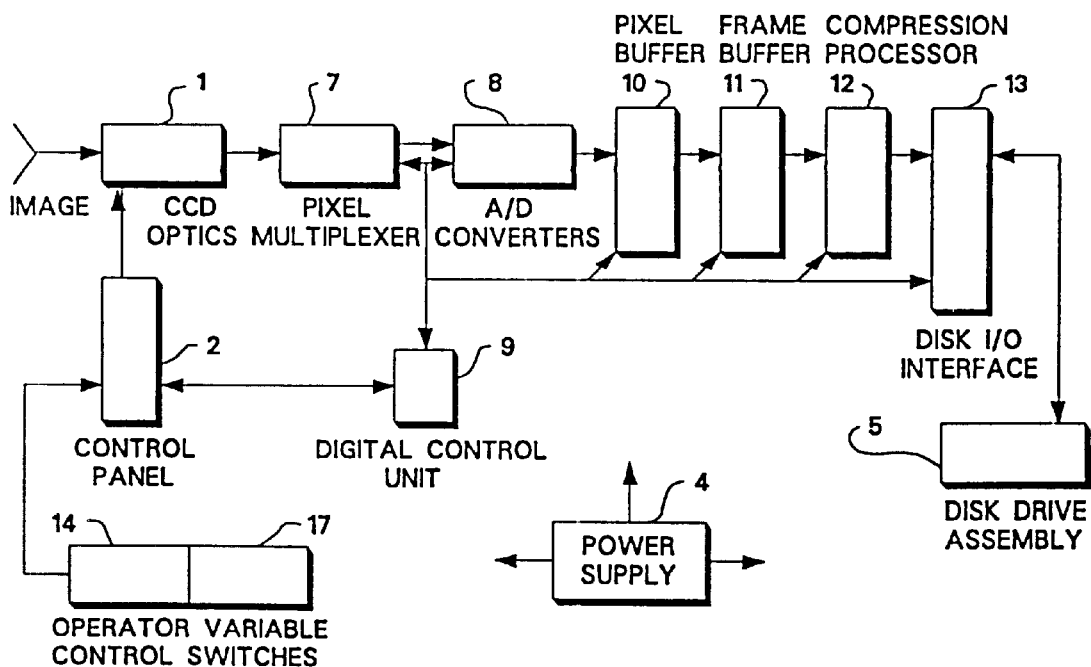
FIG. 2 is a schematic block diagram of the of the overall structure of an electronic still camera embodying the present invention.

FIG. 2 is a schematic block diagram of the preferred embodiment of an electronic still camera in accordance with the principals of the invention. Referring to FIG. 2, an image optical pick-up element 1, which for example could be a Charge Coupled Device (CCD) (or an Infrared (IR) or Ultraviolet (UV) sensor), converts a still image of an object into an electric signal when a picture "shoot" command is initiated by the operator via control panel 2. When taking a picture, focusing and shutter speed are controlled by a lens system and shutter speed selection mechanism under control of the digital control unit 9. The camera, like other still video cameras, employs an electronic shutter system that controls a charge storage time in a CCD array onto which an image of an object is focused through the lens system.

When the "shoot" control 6 is half depressed (see FIG. 6) a power supply voltage is supplied from the rechargeable batteries 4 to the electronic circuits and digital control unit 9, control panel 2, and the disk drive assemble 5. The exposure control circuitry not shown generates appropriate horizontal and vertical transfer pulses as well as field shift pulses under control of the reference clock timing and control signals provided by the digital control unit 9 type for driving the CCD device and pre-processing circuitry. This design may be of any type well known in the art for example those cited in U.S. Pat. Nos. 4,131,919 and 4,456,931 and any similar designs well known in the prior art.

Figure 6:
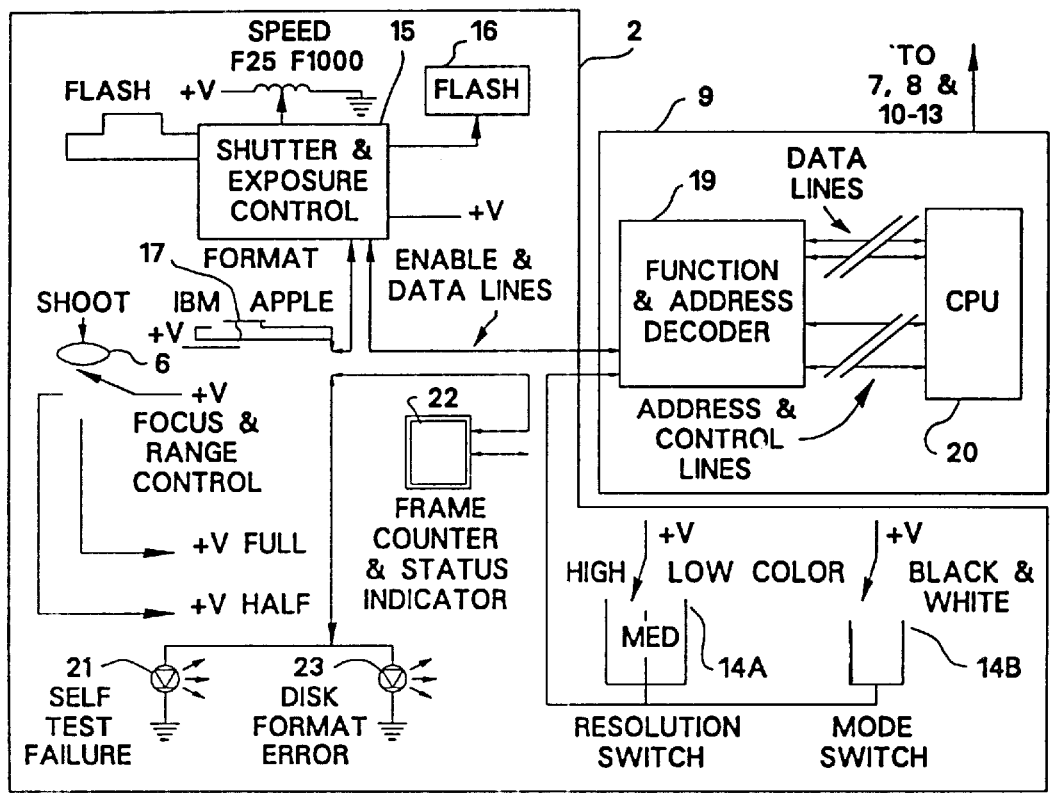
FIG. 6 is an example of the control panel logic in accordance with one aspect of the present invention.
Figure 6A:
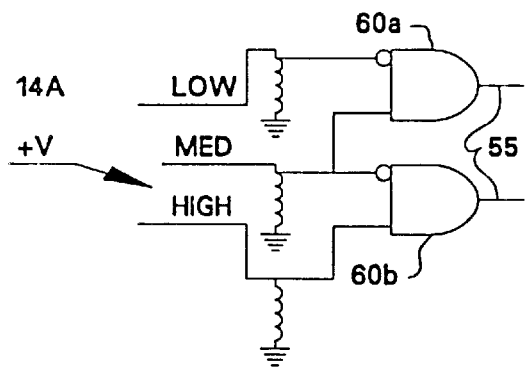
FIG. 6A is an example of one embodiment of switch logic of the control panel switches and controls utilizable in accordance with one aspect of the present invention.
Figure 6B:
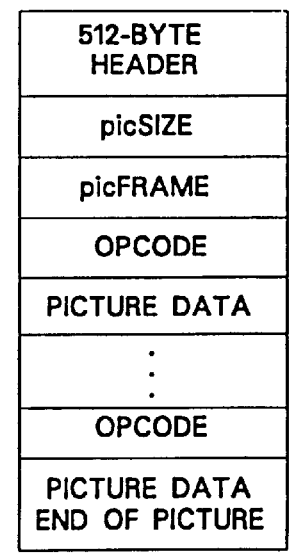
FIG. 6B is an example of the PICT image file format based upon the published standard provided by Apple Computer, Inc.
Figure 6C:
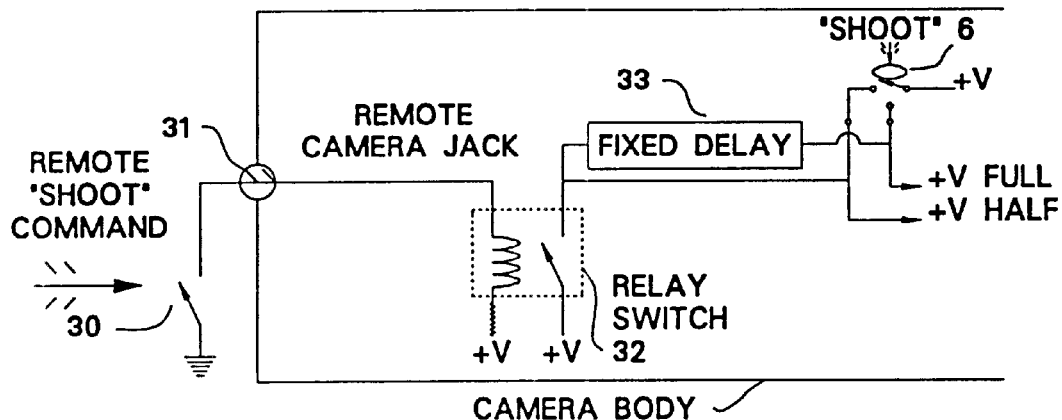
FIG. 6C is an alternate embodiment of the current invention embodying remote operation.

An alternate embodiment of the present invention that provides remote operation of the camera is shown in FIG. 6C. When remote "Shoot" control 30 is activated by any means for example manually, or by radiant, or electronic energy, a control signal is generated and routed through the external jack 31, located on the external camera body. The external control 30 is electrically connected to the external jack 31 by a twisted-pair conductive cable assembly that is familiar to those skilled in the art. Upon receipt of the externally generated "shoot" command, the relay switch 32 is activated and provides internal switch closure. This closure of switch 32 then initiates the process previously described and privides the half V+ voltage previously described. The full V+ is provided via the fixed delay 33, the value chosen to allow the diskette drive assembly 5 (FIG. 2) and associated control circuitry to initialize prior to receiving image data.

When the "shoot" control is fully depressed in either embodiment, the shutter controller 15 (FIG. 6) generates a shutter pulse that generates control signals for the A/D converters 8 allowing the image/picture data signal in the sample and hold circuitry of the pixel multiplexer 7 to be converted into a digital signal. Control and address instructions of the type well known in the art are generated from the digital control unit 9 to facilitate the storage of the digital image data within the pixel buffer 10 and frame buffer 11. Upon completion of image conversion, the contents of the frame buffer are transferred to the compression processor 12 which for example may be of the many versions currently offered commercially such as C-Cube's (San Jose, Calif.) four chip Application Specific Integrated Circuit (ASIC) set. In the compression processor 12, the Joist Photographic Experts Group (JPEG), a part of the International Standards Organization (ISO) which is a subset of the International Telegraph and Telephone Committee (CCITT), image compression algorithm fully described in Report # JTC1/SC2/WG8 dated 1985 is performed under control of the digital control unit 9 to compress the size of the image. A variable selectable compression ratio of up to 50:1 is performed on the digital image frame. Other compression ratios are operator selectable via the control panel 2 switches 14A and 14B (FIG. 6). The compressed digital frame is then formatted into either an IBM PC/Clone (such as GIFF) or Apple Macintosh (such as PICT II) image file format depending on the setting selected by the operator for a user switch 17 (FIG. 6) position on the control panel 2. After formatting, the file is written into a temporary memory buffer within the disk input/output I/O) interface circuit 13 which, under the command of the digital control unit 9, controls the high density (1.4 Mbyte storage capacity) disk drive unit 5. Following file transfer to the diskette e.g., the frame counter display 22 on the control panel 2 is updated by appropriate control signals and the camera is ready to undergo the same procedure for the next image. Power to the electronic circuits and disk drive system is terminated following release of the "shoot" control switch 6.

Figure 2A:
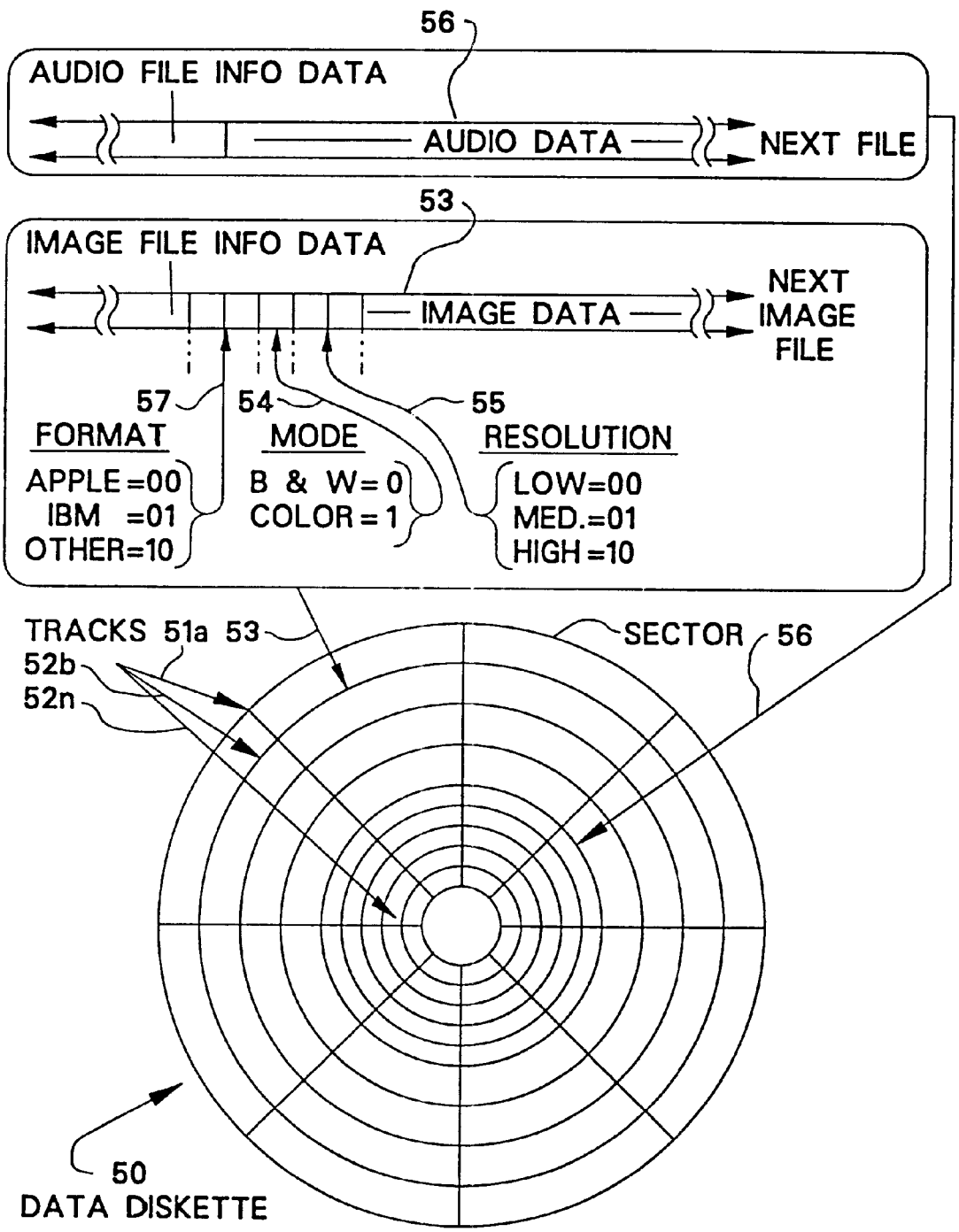
FIG. 2A is an illustration showing one embodiment of an audio data file, data format flag, compression level, and color/black and white mode selection values stored on a digital memory diskette storage device.

In accordance with the preferred embodiment of this invention, it is permissible for the user to select various resolution quality image recording levels with the higher levels being at the expense of memory diskette storage capacity. The position of switches 14A and 14B for example could represent a unique digital mark or word that denotes the respective switch position and is sensed during initial power application and periodically during operation. FIG. 6A illustrates typical logic AND gate circuits 60a and 60b utilizable in conjunction with switches 14A and 14B or switch 17 to generate appropriate signals to designate respective switch positions and generate appropriate control signals from. The switch positioned in the High position for high resolution allows only four to five images to be stored, while Med. switch position for medium resolution allows approximately twenty five images to be stored, and Low for low resolution allows up to fifty images to be stored on a single diskette. Also, by selecting black and white mode instead of color via switch 14B, the operator may select additional storage capacity since storage is increased by a factor greater than three (one element per pixel versus three for color). Various image resolution combinations are permissible because the operator can select a different resolution and mode setting for each image prior to image signal capture. This is accomplished by marking or "tagging" each image frame data information signal with the resolution and mode of each image as it is written onto the memory diskette in any suitable manner, for example as shown in FIG. 2A. With reference to FIG. 2A, diskette 50 has tracks 51a, 52b . . . 52n. With reference to track 52b there is shown a representative portion of segment 53 depicting a typical image file information format having digital bit 54 depicting color mode, and digital bits 55 representing compression resolution level markings or tags. With reference to color mode tag 54 it can be seen that if switch 14B is in the color position tag 54 is recorded as a logical "one" or true-conversely if bit 54 is recorded as a logical "zero" it corresponds to the black and white position of switch 14B. Similarly as shown switch 14A would record in memory position 55 a binary "zero" for low resolution, a binary "one" for medium resolution and a binary "two" for high resolution selections by the operator. By incorporating this "tagging" approach, it is possible for the decompression algorithm, loaded into any PC prior to use or written onto the memory storage diskette along with the image data, to automatically determine the appropriate level of compression associated with image file and execute decompression efficiently.

Still another alternate embodiment in accordance with this invention incorporates an acoustic digitizer circuit which digitizes sound. There are several digitizers commercially available such as the Apple Computer Inc. Musical Instrument Data Interface (MIDI) adaptor. The output of this digitizer may be selectively connected to the CPU 20 (FIG. 7) via an additional I/O interface similar to the auxiliary V/O interface 80. The sound or audio associated with each image can be recorded, digitized, and stored on the diskette device on available tracks in an identical manner'previously described (FIG. 2A). An image file in accordance with this embodiment would be appropriately marked or tagged with the corresponding digitized audio file 56 (FIG. 2A). Upon playback on a sound configured PC, both the image and the corresponding audio would then be viewed and heard simultaneously.

Figure 5:
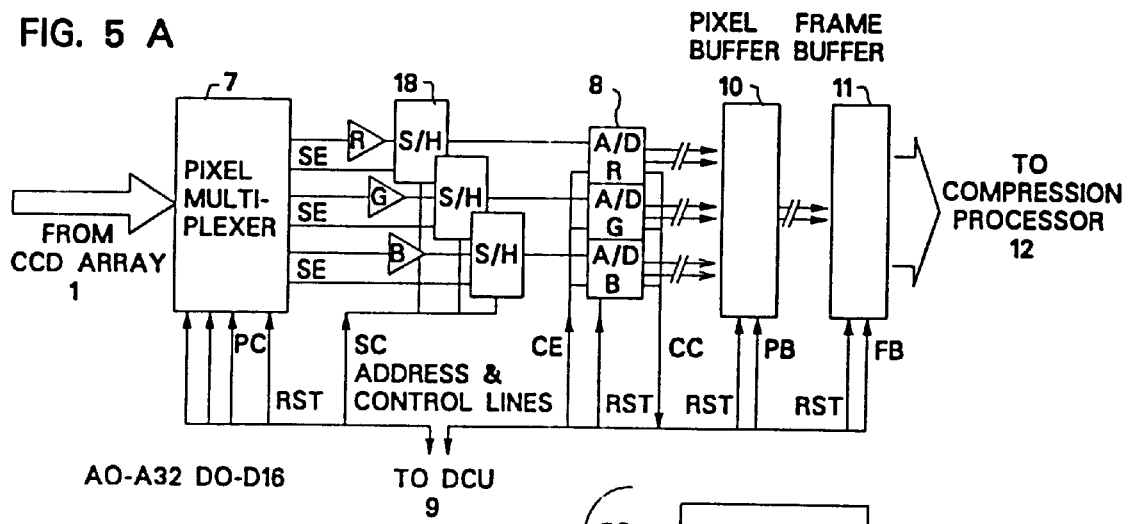
FIG. 5A is a schematic block diagram showing the image signal to digital signal conversion logic in accordance with one aspect of the present invention.
FIG. 5B is a logic and timing diagram for the image signal to digital signal conversion logic in accordance with one aspect of the present invention.

It should be noted that a major advantage a camera in accordance with the present invention has over conventional still video cameras is that a camera according to this invention is capable of storing multiple digital images in semiconductor memory temporarily at a rapid rate while, simultaneously, the image compression processor 12, file formatter software algorithm, and disk I/O interface 13 that stores formatted files continue to function in concert together at a slower rate. This efficient design coupled with VLSI low power, high speed semiconductor memory devices (10 & 11 FIG. 5A and 24 FIG. 7) allows this operational capability.

Like most other still video and conventional film cameras, when the "shoot" control 6 (FIG. 6) is fully depressed, a control signal is generated from the digital control unit 9 that generates a trigger signal on the control panel 2 to cause a flash unit 16 (FIG. 6) to irradiate a flash of light onto the subject image.

Figure 3:
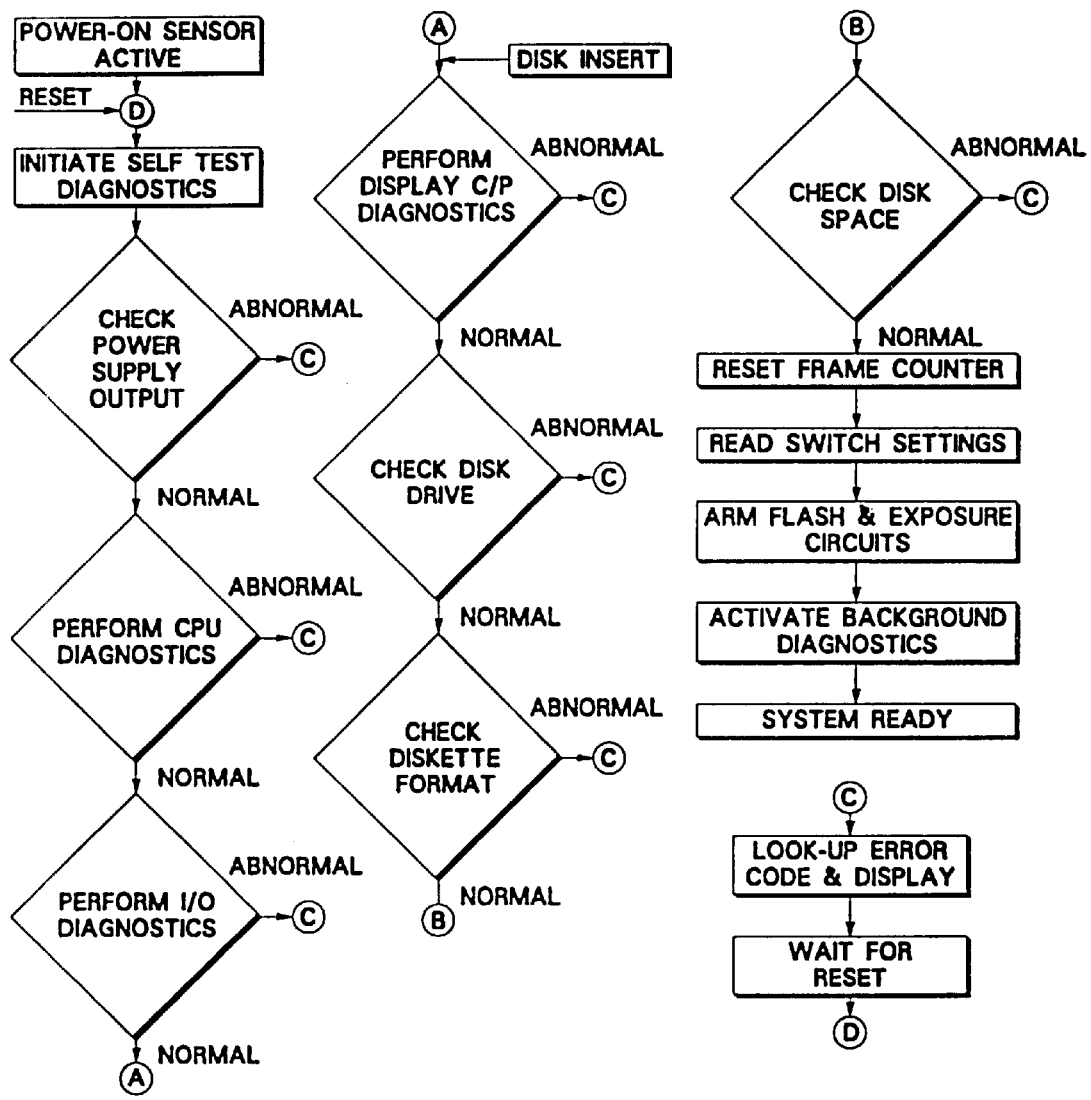
FIG. 3 is a flowchart showing the power-up and continuous self-test sequence in accordance with one aspect of the present invention.

During initial camera operation, the user first inserts a diskette such as a standard three and a half inch or similar storage medium. Various memory diskette sizes and formats are suitable for the invention. However, for the preferred embodiment either a double-density (800 Kbytes of storage) or a high-density (1.4 Mbytes of storage) diskette in a three and a half inch format which are readily available from various commercial sources such as Sony, Maxell and Verbatim. The user must then select the desired PC format (IBM PC/Clone or Apple Macintosh, etc.) via switch 17 (FIG. 6) on the control panel 2. As shown in FIG. 3.; after turning on the power switch or inserting a diskette 50, the digital control unit 9 performs a self test of all internal circuitry, battery, disk drive unit, and control panel. Should any failures be detected, an appropriate error indicator is illuminated on the control panel. During the power-on sequence (see FIG. 3 and FIG. 12), the inserted diskette 50 is automatically checked for formatting consistencies in accordance with the format selected by the format switch 17 on the control panel 2 (IBM/Apple/etc.) and for available storage space by checking the boot block on the diskette, a technique that will be familiar to those skilled in the art. Should any inconsistencies be detected, an error indicator is illuminated on the control panel (ie, disk full, unformatted, etc.). The operator frame counter display 22 (FIG. 6) is then updated to show the maximum number of pictures available based upon indicated operator selections (color/black and white), diskette type (double versus high density), and capacity (partially full versus empty diskette). During operation, the operator can selectively erase a frame and record over it if desired by selecting the erase mode of operation from the control peel and toggling the forward/reverse control.

Figure 4:
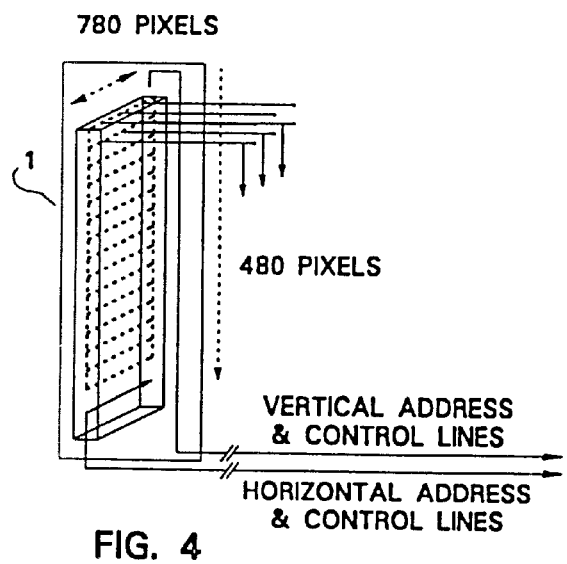
FIG. 4 is an example of a ½" CCD array utilizable in accordance with one aspect of the present invention.

The optics for the preferred embodiment of the invention is a commercially available one-half inch (½") color CCD device having a pixel grid array of 780×488 as pictorially depicted in FIG. 4. This results in 380,640 pixel elements which results in a commercially acceptable quality resolution image as will be understood by those skilled in the art. In a color imaging device (CCD array) photoelectric elements, such as photodiodes, are arranged in a two dimensional array with optical filters for R (red), G (green), and B (blue). Various arrangements of optical filters are well known and the arrangement of optical filters is not limited to a particular one with this invention. During operation each pixel stores a charge corresponding to the amount of incident light. The RGB components of each pixel's charge is sequentially read out via a horizontal/vertical addressing scheme that will be familiar to those skilled in the art.

Figure 5B:
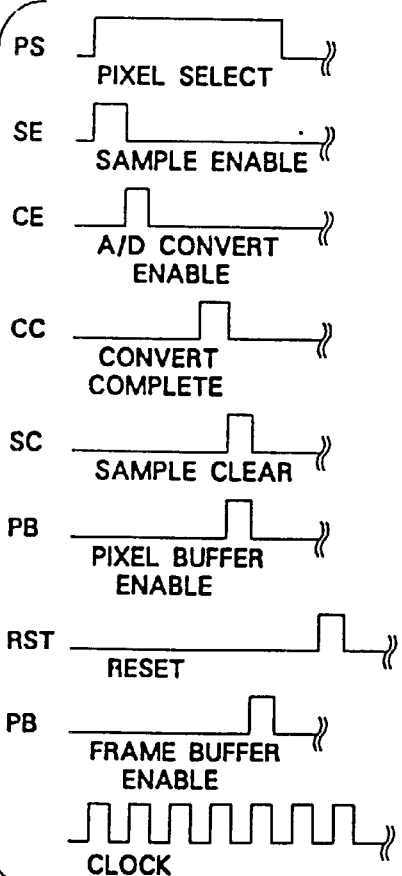

As shown in FIG. 5A; each charge, when addressed, is amplified and processed in a sample and hold (S/H) circuit 18. The analog voltage in each S/H circuit is digitized by an associated analog to digital (A/D) converter 8. The digital values are routed and collected in the pixel buffer 10. Following completion of discrete pixel element conversion and subsequent formatting in the pixel buffer which is under Control Processor Unit (CPU) 20 software control, the output of the full pixel buffer is routed to the frame buffer 11 by digital control unit 9. This process continues until a complete frame is collected within the frame buffer. The general digital logic and timing and control signals for this circuitry is shown in FIG. 5B. The timing is provided by a master clock that is an integral part of the CPU microprocessor. For example, the MOTOROLA 68040 microprocessor has a clock speed of approximately 40 Megahertz (MHZ) which results in a clock period of 25 nanoseconds (nsec.). This clock pulse is used by the function and address decoder 19 (FIG. 6) to generate the address and control signals shown in FIG. 5B as would be understood by those skilled in the art. The circuit of the present invention may be designed by one skilled in the art to function with a variety of microprocessor architectures and is not limited to any one in particular. One can see from the timing chart that the S/H circuit is allowed (via the SE command) to charge to a voltage level indicative of the analog voltage impinging upon the pixel element (via the PS command). After a fixed time period, the A/D converters are enabled (via the CE command) to begin conversion of the analog voltage value on the S/H. Upon completion of conversion, a conversion completion signal (CC) is generated by the A/D and routed back to the S/H circuit (via the SC command which is generated by the function and address controller 19) to discharge the stored analog voltage in anticipation of the next pixel element conversion process. Next, the output of the A/D converter 8 is clocked into the pixel buffer 10 (via the PB command). When the pixel buffer 10 is full, the output is clocked out to the frame buffer 11 (via the FB command) and the pixel multiplexer address circuitry selects the next pixel for conversion. Reset signals (RST) are sent to all circuit elements to allow these devices to reset prior to receiving the next analog value.

Another novel concept of the present invention as illustrated in FIGS. 5A and 5B utilizes a technique of paralleling the S/H and A/D devices for each pixel element thus accelerating the image signal analog-to-digital conversion process. This is accomplished by eliminating the serial S/H and A/D path typical of prior art still video camera designs. In addition, high-speed, low-power devices available from Sony, Burr-Brown, Datel, Analog Devices, and others facilitate the increased conversion throughput of the S/H and AID circuits with pixel conversion times of less than 150 nanoseconds (nsec.). For example, Sony's video A/D converter Device part number CXA1016P/K performs up to 50 million samples per second or 20 nsec. per conversion. This device, or similar, may be used in the preferred embodiment of the present invention. As explained previously, prior art still video camera designs multiplex each signal component into a common/singular A/D path to reduce the number of components and power consumption. However, in accordance with another aspect of the present invention components such as C-MOS and ECL devices coupled with miniaturized packaging techniques such as surface mount devices (SMD) and ASIC technology make it feasible to incorporate these devices in a parallel design in order to realize a substantial increase in conversion speed with no appreciable increase in power consumption. Therefore, this design approach provides significant conversion throughput increases over previous designs.

The extremely high conversion speed in accordance with another concept of the present invention makes multiple high-speed camera operation possible in an alternate embodiment. For example, total conversion time required for the aforementioned CCD array utilizing the circuit of the present invention (FIG. 5A) requires approximately 380, 640×150 nsec. or 38 milliseconds (msec.). Additional time (approximately 5 msec.) is required for timing and control signal latency. Thus, total conversion time for a complete image frame prior to compression processing and logging to the memory storage diskette 50 is less than fifty msec. This allows for approximately 20 images to be captured in a one second period. By adding additional RAM 11A (FIG. 13) or other forms of commercially available random access memory to the frame buffer 11, image frames could be "pushed" onto a semiconductor memory stack for temporary storage allowing the compression processor and data interface circuitry to perform their respective functions at a slower rate. As shown in FIG. 13, each unprocessed image frame would be recorded or "pulled" from the stack on a "First-In, Firs-Out" (FIFO) manner until all images in the stack queue were processed and written to the storage diskette via the disk I/O circuitry 13.

As shown in FIG. 6, control panel settings are monitored by the CPU 20, a microprocessor, thus allowing the appropriate timing, control, and signal processing to be effected properly. The microprocessor 20 may be of the type 68040 manufactured by MOTOROLA, Intel's 80386 series, or equivalent microprocessors which specifications are commercially available and are incorporated herein by reference. The microprocessor utilization of this invention, which is in the digital control unit 9, transmits commands and status to specific controls, functions, and displays in the control panel as well as receiving both circuit status/control data and operator commands through polling the operator switch settings 14A, 14B, and 17 via the bidirectional function and address decoder 19. This approach allows the user to know immediately how much storage capacity remains in the image storage diskette 50 as well as the camera's overall operational and functional status through the use of status displays 21, 22, and 23 and ongoing software self-tests running in the background as depicted in FIG. 3. An example of this would be a low battery situation. First, the digital control unit 9 would detect a failure in the self-test mode. Next, the self-test light emitting diode 21 (FIG. 6) would be illuminated and an appropriate error display would be illuminated in the status display 22 thus providing the user with an exact indication of the error. Another example illustrating the operation of this embedded microprocessor type of control approach is the format switch 17 (FIG. 6). The position of the format switch 17 is sensed upon power application. Following diskette insertion, the boot block on the diskette is compared with the format switch 17 setting (IBM/clone or Apple) and if the format does not match or if the disk 50 is unformatted, the disk format status light emitting diode 23 would be illuminated and an appropriate error display would be illuminated in the status display 22 thus prompting the user to take appropriate corrective measures.

An alternate embodiment of the present invention involves adding an auxiliary I/O interface circuit or port to the digital control unit 9. As shown if FIG. 7, the auxiliary I/O port 80 connects in a manner similar to the Disk I/O interface 13.This additional I/O channel provides for external control and monitor of all timing and control signals internal to the camera. In addition, it allows for the image data to be routed past or around the compression processor out to any additional internal or external device such as an optical disk storage device, digital analyzer, or other data processors that might be desired.

Figure 7:
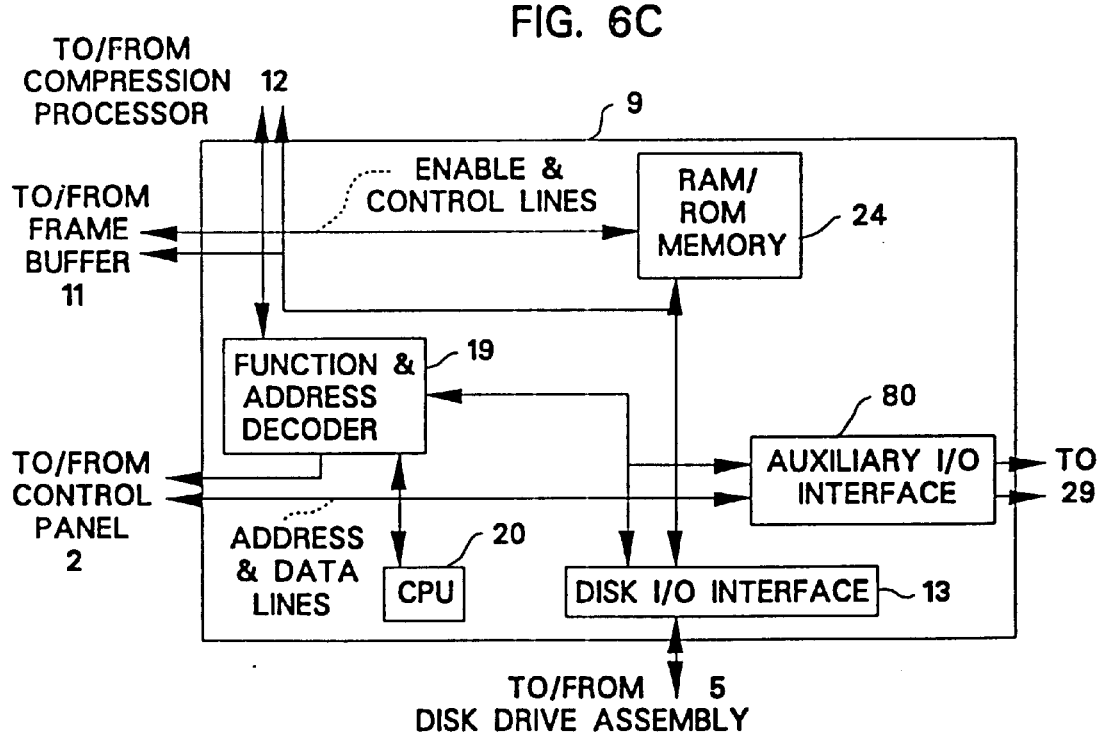
FIG. 7 is a simplified block diagram of the digital control unit in accordance with one aspect of the present invention.

FIG. 7 shows the digital control unit 9. The microprocessor 20 architecture here is typical to one familiar with the art. The frame buffer 11 (FIG. 5A) receives and stores the outputs of the pixel buffer 10 until a complete frame of image data is received. Then, the CPU 20, under software control, issues a control signal to the optics logic in the shutter and control circuitry 15 (FIG. 6) thus resetting those functions for future image recording. The full frame buffer 11, upon command from the CPU 20, transfers it's data into the compression processor 12 (FIG. 2) which performs thousands of levels of parallel pipeline processing on the image data. The compressed image frame is then written out to the mass memory RAM (Random Access Memory) 24 where it is temporarily stored until transferred to the disk drive assembly 5 via the disk I/O interface circuitry 13.

Referring to FIG. 8, a flowchart shows the steps involved in the image compression process performed by the image compression processor 12 (FIG. 2) in accordance with the preferred embodiment of the present invention. The output of the frame buffer 11 is transferred into the input of the image compression processor 12 under the control of the digital control unit 9. As previously described, the setting of switch 14A (FIG. 6) is read by the CPU 20 (FIG. 7) to determine the image resolution quality desired. Depending on the operator selected setting of switch 14A, the unique digital word generated by the AND gate 60a–b (FIG. 6A) which is activated by the selected position of switch 14A is routed to image compression processor 12 via CPU 20 (FIG. 7) which selects for example a predetermined digital memory location containing the appropriate corresponding compression ratio parameters under program control. The compression processor uses this command value for example to establish the size of the covariance matrix and a threshold for acceptance for the variances produced by the Discrete Cosine Transformation (DCT) transform coefficients. Next, the digital image signals are converted from the RGB format previously discussed in connection with FIGS. 2, 5, and 6 into luminance and chrominance signals. The luminance and chrominance signals subsequently undergo a DCT. The cosine transformed signals are then quantized and are then processed for Huffman coding. The Huffman coded image signals are then formatted into a form that facilitates format processing into various PC compatible formats (GIFF, PICT2, etc.). For a more complete understanding of the image compression process reference may be made to I.E.E.E. Catalog No. EH0231-1, Library of Congress No. 85-60384 published by the I.E.E.E. Society dated 1985 and incorporated herein by reference.

Of the two traditional classes of image compression techniques, spatial coding and transform coding, transform coding techniques lend themselves well for this application due to computational simplicity. Transform coding techniques that provide good visual fidelity include: Karhunen-Loeve transform (KLT), Fourier, cosine, sine, and Hadamard. The KLT algorithm offers the best visual fidelity but suffers from serious computational complications due to extremely large matrix size. Several alternate algorithms that offer reasonable visual fidelity that are computationally feasible for this invention include the Fast Fourier Transform (FFT), Discrete Cosine Transform (DCT), and Discrete Sine Transform (DST). The DCT was adopted by the JPEG as the preferred algorithm due to computational simplicity and performance.

It should be noted that the Joint Photographic Experts Group (JPEG) (composed of experts from many companies including IBM, AT&T, Digital Equipment Corp, and INTEL) compression/decompression standard was developed in 1985 in response to the lack of interoperability between image and processing equipment due to numerous proprietary standards held by each manufacturer. The JPEG standard provides image compression effectively up to 75 times or greater depending on the visual fidelity desired. The JPEG standard is widely used in industry as an alternative to proprietary algorithms such as Intel's own proprietary standard called DVI which was initially developed by RCA before being sold to INTEL, the integrated Circuit manufacturer. INTEL offers it's own firmware compression processor incorporating their DVI standard delivering compression ratios in excessive of 100:1. However, a new international standard called MPEG is due to be announced in the 1991 time frame from the JPEG arid should offer compression ratios of 275:1 and greater. In the preferred embodiment of the present invention, the JPEG standard is the preferred algorithm chosen with the incorporation of the the MPEG standard or other similar standard in the future when available commercially. An alternate embodiment of the present invention would be the incorporation of various proprietary compression algorithm standards such as DVI.

The compression/decompression algorithm firmware implementation of the JPEG algorithm is available commercially from various sources including C-Cube, Electronics for imaging, Storm Technology, Burr-Brown, Spectral Innovations Inc., INTEL, and others. The implementation of this algorithm for the present invention may incorporate the integrated circuit set commercially available from C-Cube. Their four chip ASIC JPEG algorithm implementation is performed in three basic steps: first, the image is divided into 8-by-8 pixel squares and applies a discrete cosine transform (DCT) to each square resulting in 64 frequency values; second, these frequencies are put through a quantization algorithm to eliminate unimportant frequencies; third, the remaining values are run through a Huffman coding scheme to encode the most frequently occurring values using the fewest bits. A compatible software implementation of the JPEG algorithm is available commercially from Aladdin Systems, Radius Inc., Kodak, and others.

Those skilled in the art will be familiar with the process and the commercially available software and firmware chipsets that are currently available on the market. The present invention incorporates both available firmware chipsets in the camera and software for use in the PC for decompression. The decompression algorithm can be written onto the camera's diskette 50 prior to any image data recording. This allows the PC user to take the diskette 50 to a PC and directly incorporate the image data because the image file selected by the user is automatically decompressed transparent to the user. The algorithm can be written onto an unused track 52 or sector combination on the diskette as shown on FIG. 2A. Alternatively, the decompression algorithm can be loaded onto a PC before inserting a diskette 50 containing compressed image data. In the latter embodiment the resolution and mode values 54 and 55 (FIG. 2A.) for each representative image would be read from diskette 50 in order to appropriately control the selection and activation of the appropriate corresponding decompression algorithm.

As shown in FIG. 7, the output of the image compression processor 12 is routed to the RAM memory 24 where the compressed image is formatted for either the PICT II or GIFF format depending on the setting of format switch 17 (FIG. 6). It should be noted that a large number of image formats for PCs exist. PICT and GIFF are the most common for the Apple and IBM PC's and are therefore the preferred formats for the present invention although other formats can be easily incorporated into the design by changing the software format routines. These software image formats are commercially available from many sources most notably Apple computers for PICT and IBM for GIFF. An example of the PICT format is pictorially shown in FIG. 6B as will be familiar to those skilled in the computer arts. Once formatting is complete, the formatted image data is transferred to the disk I/O interface 13 for transfer to the magnetic recording diskette 50.

Figure 9:
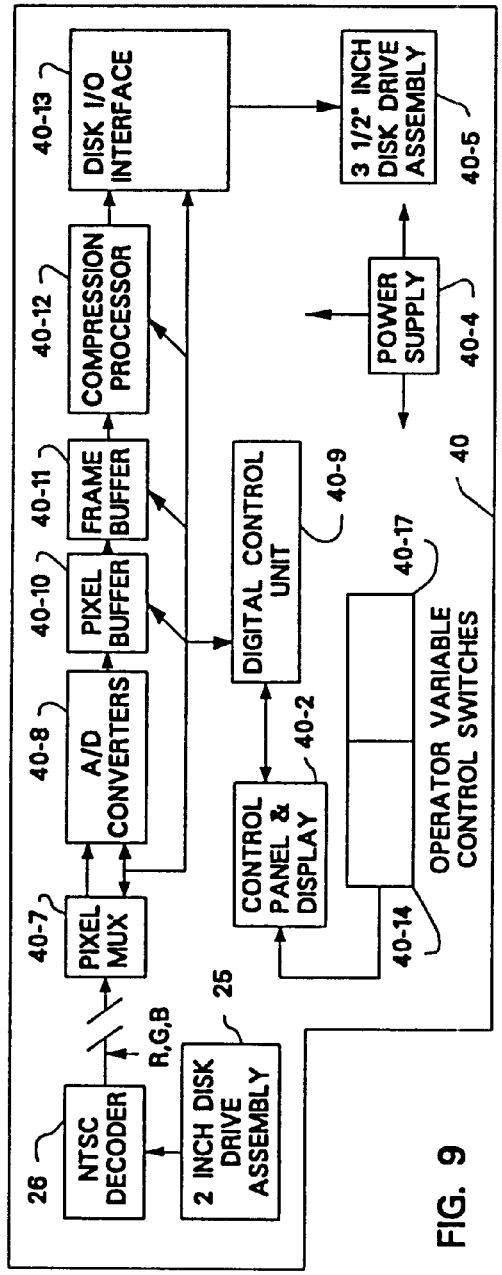
FIG. 9 is a block diagram of a video format translator device in accordance with one aspect of the present invention.

FIG. 9 and FIG. 10 illustrate the preferred embodiment of the video format translator device in accordance with another aspect of this invention that converts other still video camera formats for example on two inch video diskette to this invention's selectable PC compatible digital format. The general concept of operation is shown in FIG. 10. In FIG. 9 correspond parts and subassemblies in translator 40 are shown with like numbers corresponding to FIGS. 2 and 6 having a 40 hyphenation prefix designation and such parts and subassemblies perform similar functions to those described above with reference to FIGS. 2 and 6. Referring again to FIG. 9, the translator 40 incorporates the same components utilized in the digital circuit card assembly which houses both the digital control unit 9 and optics processing circuits (pixel multiplexer 7, A/D 8, etc. 10–13). The major difference is that the CCD array 1 is replaced with an input disk drive 25, for example a two inch (2") video disk drive assembly, and an NTSC video format decoder 26 which converts the composite video signal to an RGB format for processing as described previously.

Figure 11:
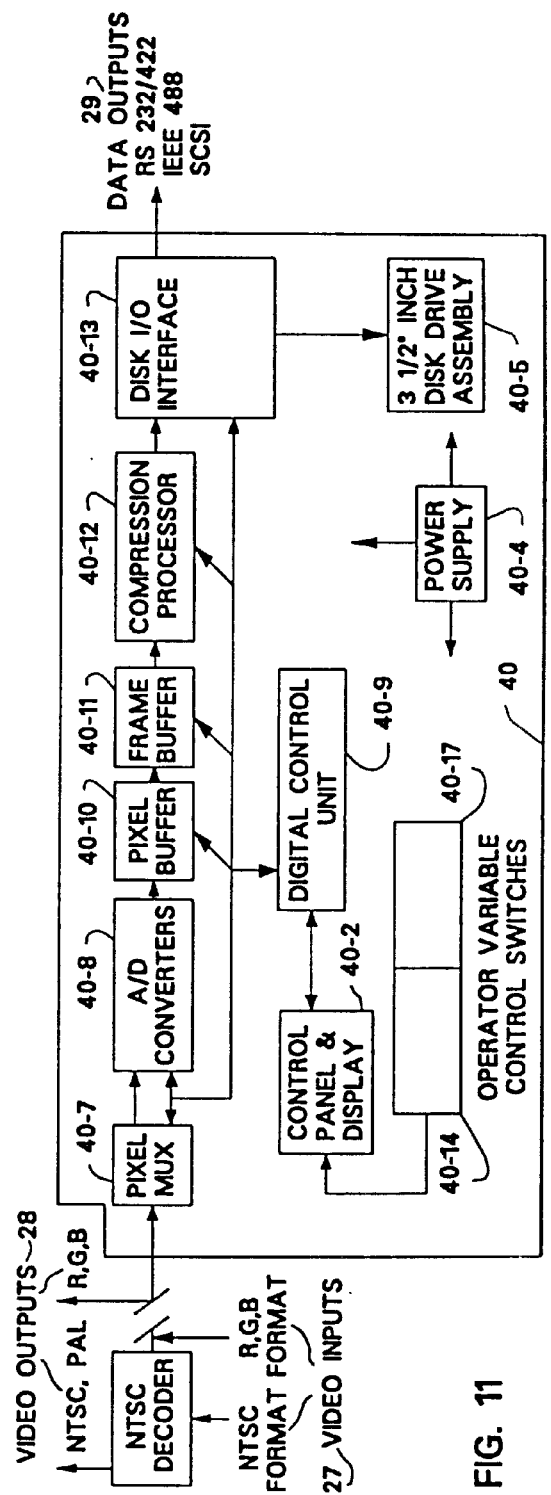
FIG. 11 is an alternative embodiment of the video format translator in accordance with another aspect of the present invention showing additional video inputs and data outputs.

FIG. 11 displays an alternate embodiment of the video format translator device 40 of the present invention that shows optional inputs 27 and outputs 28 and 29. The exact same circuitry is utilized that was used for the translator device 40 as shown in FIG. 9 except that inputs 27 for either an NTSC/PAL format or RGB format video signal is provided. This allows video signals from other sources such as a cable TV, CAMCORDER, or other video signal source to be digitized and archived in a PC compatible format. Also, provisions for video output jacks 28 are made to allow either viewing of the image/video source prior to or during image recording. Finally, provisions are made to provide a data output 29 to allow connection to other PC peripherals such as a communications modem, larger/smaller disk drive assembly, optical disk, specialty display or signal processor/analyzer. Either a standard serial, parallel, or Small Computer Standard Interface (SCSI) data port can be readily connected to the auxiliary I/O interface 80.

Figure 12:
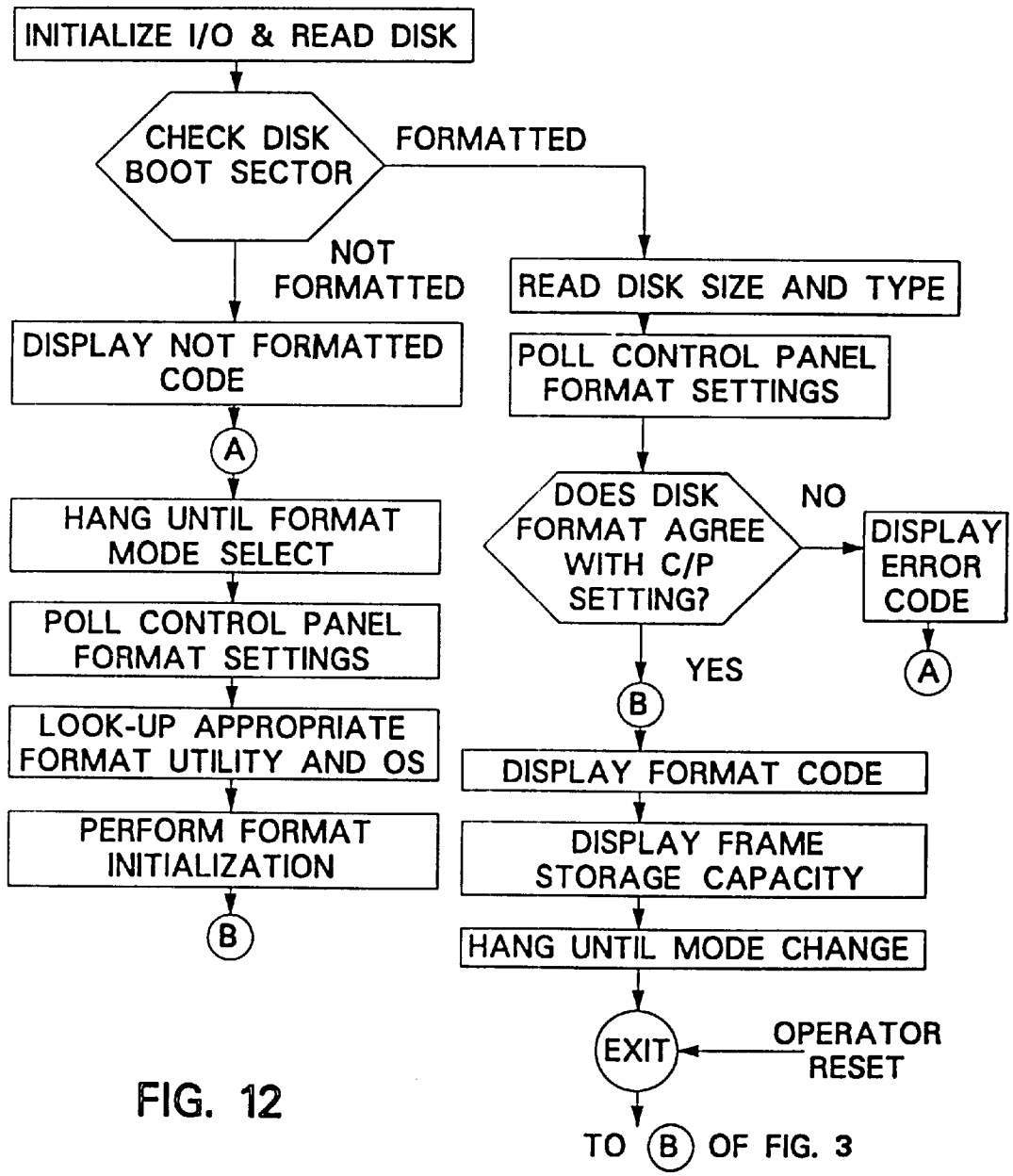
FIG. 12 is an alternate embodiment of the invention showing an optional diskette format utility flowchart.

FIG. 12 depicts an alternate feature of an embodiment of the present invention that shows how an inserted diskette 50 that is either unformatted or formatted for a undesired (e.g., not corresponding to the setting of switch 17-FIG. 6) PC configuration would be automatically properly formatted for use with a camera in accordance with another aspect of this invention. This capability allows the user of this invention to forego the requirement to pre-format the storage medium (diskette) on a PC prior to using it in the camera operated in accordance with the present invention. With reference to FIG. 3 the power-on sequence process would result in an abnormal diskette format error if the format of an inserted diskette 50 did not correspond to the operator selected format switch 17 (FIG. 6). In accordance with the automatic diskette format option, CPU 20 of digital control unit 9 in response to the abnormal diskette format error would initiate the diskette format process illustrated in FIG. 12. Upon completion of the diskette format process illustrated in FIG. 12, the power-on sequence illustrated in FIG. 3 would continue from step B.

Figure 14A:
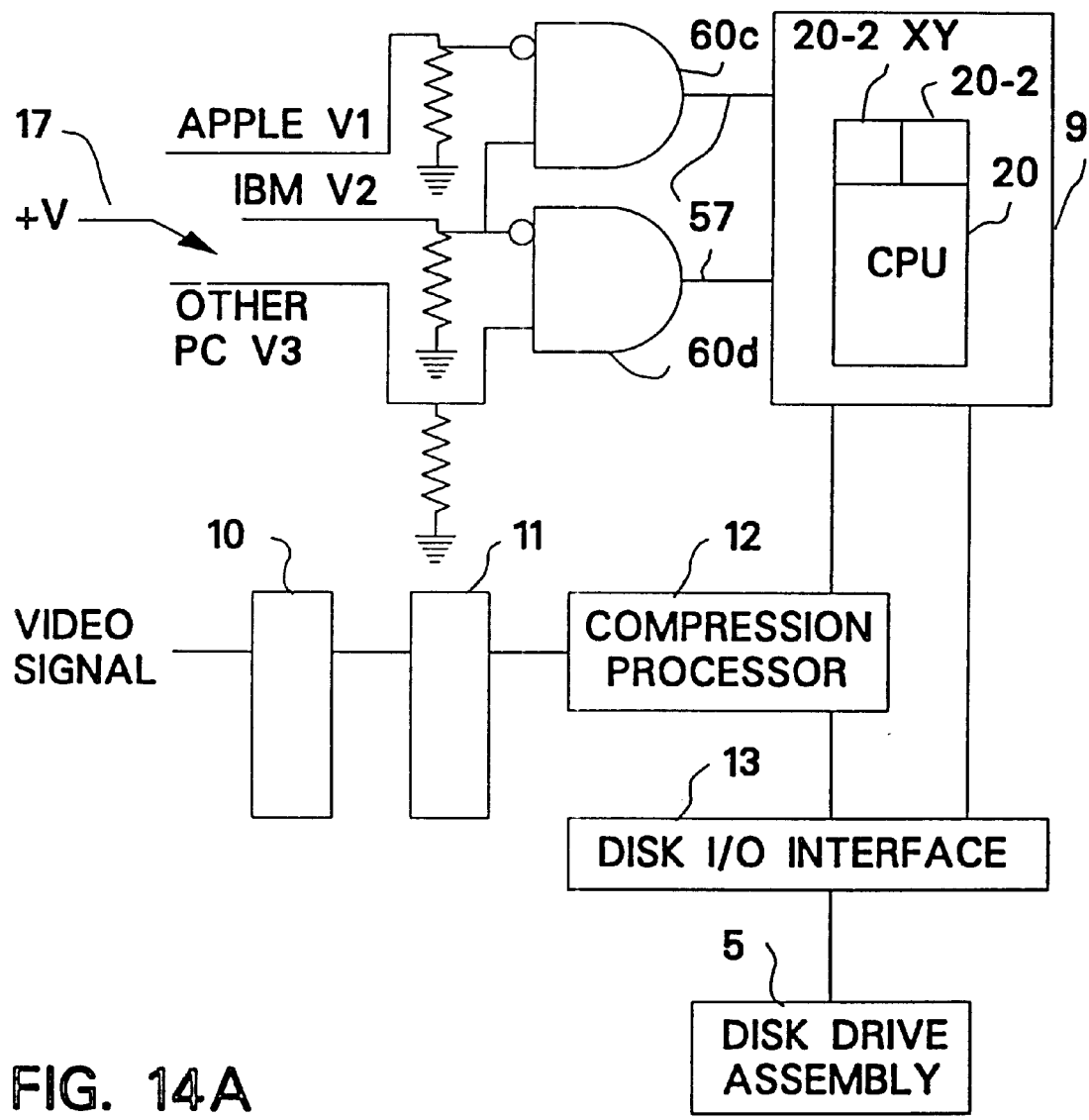
FIG. 14A is a block diagram of an embodiment of the format select logic in accordance with one aspect of the present invention.
Figure 14B:
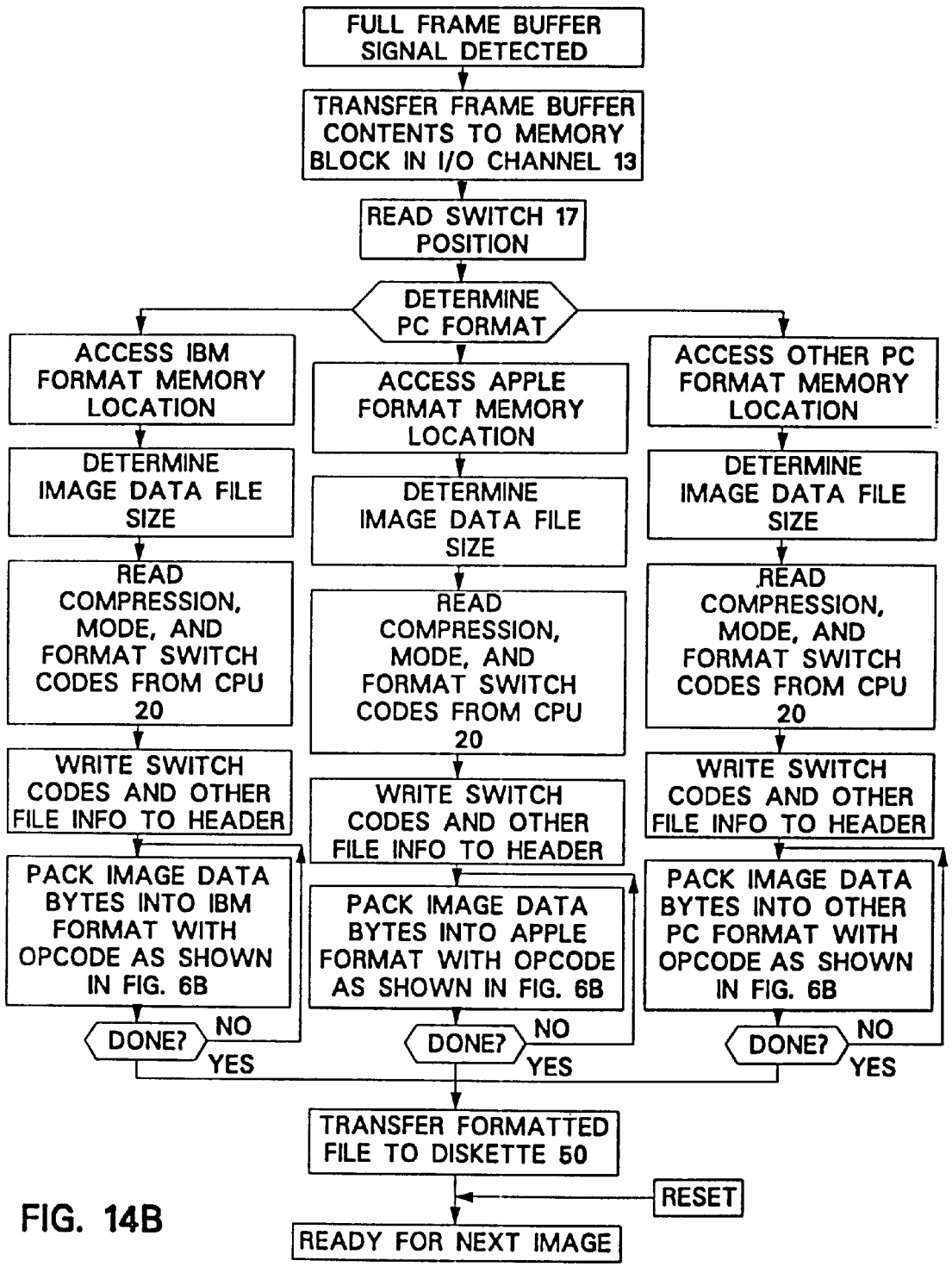
FIG. 14B is a flow diagram illustrating the steps of the format selection logic operations.

Referring now to FIG. 14A, there is shown a schematic block diagram of the format selection logic in accordance with another aspect of the present invention. During the power-on sequence as described in connection with FIGS. 3 and 12, processor 20 of control unit 9 initiates a format selection switch sample and test routine as more fully described in the flow diagram illustrated in FIG. 14B. Switch 17 is illustrated in FIG. 14A in the Apple PC position and logic level v1 is applied as inputs to logic gates 60c and 60d. As illustrated in FIG. 2A, the format signals 57 for the Apple PC format is a logic "zero" and conversely the format signal or tag 57 if the format switch 17 were in the IBM PC or other computer type position would be a logic "one" and "two" respectively. In response to the logic "zero" indicating Apple PC format, processor 20 accesses a unique memory location XY of format memory 20-2 which for example may comprise any random access memory with two megabytes storage capacity. The data format for the operator selectable predetermined number of computer architectures, similar in content and arrangement to those illustrated in FIG. 6B for an Apple PC would be stored in memory 20-2 which would be addressed in response to the other operator selectable position of switch 17 to generate the other unique codes 57 as shown in FIG. 2A. Processor 20 in response to a stored format subroutine more particularly shown in FIG. 14B contains the allocation of data memory addresses in disk input/output interface unit 13 in accordance with the picture image file format as illustrated in FIG. 6B. Thus the digital video data information signals generated by compression processor 12 are appropriately formatted and stored in memory storage disk drive 5 to insure compatibility with the format selected by the operator by selectively positioning switch 17.

Those skilled in the art will recognize the many alterations, additions or changes of the preferred embodiment may be made without departing from the scope of the following claims.

What is claimed is:

1. A digital camera for taking pictures and storing them in a removable storage device in the camera, said digital camera apparatus comprising:

an image pick-up unit for generating and outputting a digital image signal photoelectrically converted from an image incident thereon, and a digital control unit for formatting said digital image signal in one of a plurality of computer formats.

* * * * *

UNITED STATES PATENT AND TRADEMARK OFFICE
CERTIFICATE OF CORRECTION

PATENT NO. : 6,233,010 B1
DATED : May 15, 2001
INVENTOR(S) : Marc K. Roberts et al.

It is certified that error appears in the above-identified patent and that said Letters Patent is hereby corrected as shown below:

<u>Title page,</u>
ABSTRACT
Item [54], the title should be -- DIGITAL CAMERA WITH MEMORY FORMAT INITIALIZATION --.
Item [57], insert a period (.) at the end of the Abstract.

<u>Column 1,</u>
Lines 1-3, the title should be -- DIGITAL CAMERA WITH MEMORY FORMAT INITIALIZATION --.

<u>Column 2,</u>
Line 22, delete "is" (second occurrence).
Line 32, after "invention" insert -- is --.
Line 38, delete "is" (second occurrence).

<u>Column 3,</u>
Line 1, delete "of the" (second occurrence).

<u>Column 4,</u>
Line 11, "assemble" should be -- assembly --.
Line 32, "privides" should be -- provides --.
Line 51, "Joist" should be -- Joint --.

<u>Column 5,</u>
Line 63, "V/O" should be -- I/O --.

<u>Column 6,</u>
Line 34, after "FIG. 3" delete the period and semi-colon (.;) and insert therefor a comma (,).
Line 55, "peel" should be -- panel --.

<u>Column 7,</u>
Line 6, after "5A" delete the semi-colon (;) and insert therefor a comma (,).
Line 56, "AID" should be -- A/D --.

UNITED STATES PATENT AND TRADEMARK OFFICE
CERTIFICATE OF CORRECTION

PATENT NO. : 6,233,010 B1
DATED : May 15, 2001
INVENTOR(S) : Marc K. Roberts et al.

It is certified that error appears in the above-identified patent and that said Letters Patent is hereby corrected as shown below:

Column 9,
Line 18, "it's" should be -- its --.

Column 10,
Line 18, "it's" should be -- its --.
Line 22, "arid" should be -- and --.
Line 27, before "MPEG" delete "the".

Signed and Sealed this

Twenty-sixth Day of March, 2002

Attest:

*Attesting Officer*

JAMES E. ROGAN
*Director of the United States Patent and Trademark Office*

(12) EX PARTE REEXAMINATION CERTIFICATE (5684th)
United States Patent
Roberts et al.

(10) Number: US 6,233,010 C1
(45) Certificate Issued: *Feb. 27, 2007

(54) DIGITAL CAMERA WITH MEMORY FORMAT INITIALIZATION

(75) Inventors: Marc K. Roberts, Burke, VA (US); Matthew A. Chikosky, Springfield, VA (US); Jerry A. Speasl, Vienna, VA (US)

(73) Assignee: St. Clair Intellectual Property Consultants, Inc., Grosse Pointe, MI (US)

Reexamination Request:
No. 90/006,437, Oct. 28, 2002

Reexamination Certificate for:
Patent No.: 6,233,010
Issued: May 15, 2001
Appl. No.: 09/253,831
Filed: Feb. 19, 1999

( * ) Notice: This patent is subject to a terminal disclaimer.

Certificate of Correction issued Mar. 26, 2002.

Related U.S. Application Data

(63) Continuation of application No. 08/712,493, filed on Sep. 11, 1996, now abandoned, which is a continuation of application No. 08/098,787, filed on Jul. 29, 1993, now Pat. No. 5,576,757, which is a continuation of application No. 07/878,603, filed on May 5, 1992, now abandoned, which is a continuation of application No. 07/615,848, filed on Nov. 20, 1990, now Pat. No. 5,138,459.

(51) Int. Cl.
*H04N 5/225* (2006.01)
*H04N 5/262* (2006.01)

(52) U.S. Cl. .................................. 348/240.99
(58) Field of Classification Search ........................ None
See application file for complete search history.

(56) References Cited

U.S. PATENT DOCUMENTS

| | | |
|---|---|---|
| 1,999,278 A | 4/1935 | Britten |
| 3,391,623 A | 7/1968 | Tabankin |
| 3,805,281 A | 4/1974 | Narita et al. |
| 4,074,324 A | 2/1978 | Barrett |
| 4,118,687 A | 10/1978 | McWaters et al. |
| 4,131,919 A | 12/1978 | Lloyd et al. |
| 4,158,856 A | 6/1979 | Tucker |
| 4,167,022 A | 9/1979 | Dischert et al. |
| 4,262,301 A | 4/1981 | Erlichman |
| 4,300,123 A | 11/1981 | McMillin et al. |
| 4,302,776 A | 11/1981 | Taylor et al. |
| 4,315,318 A | 2/1982 | Kato et al. |
| 4,318,137 A | 3/1982 | Cordova et al. |
| 4,346,401 A | 8/1982 | Ohara |
| 4,375,650 A | 3/1983 | Tiemann |
| 4,383,274 A | 5/1983 | Inuiya |
| 4,385,361 A | 5/1983 | Moates |
| 4,394,688 A | 7/1983 | Iida et al. |
| 4,413,275 A | 11/1983 | Horiuchi et al. |
| 4,420,773 A | 12/1983 | Toyoda et al. |

(Continued)

FOREIGN PATENT DOCUMENTS

AT 374/89 2/1989

(Continued)

OTHER PUBLICATIONS

Davenport, T., Vellon, M, "Tag Image File Format Rev. 4.0" Apr. 31, 1987. Document downloaded from http://www.dcs.ed.ac.uk/home/mxr/gfx/2d/TIFF-4.txt.*

(Continued)

*Primary Examiner*—Justin P Misleh

(57) ABSTRACT

A digital camera includes a digital memory system having a control unit for checking for proper format initialization of a removable digital memory element and for performing format initialization of the memory element when necessary.

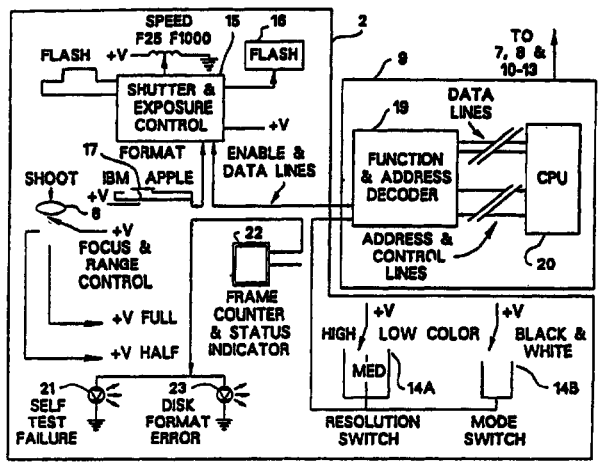

U.S. PATENT DOCUMENTS

| | | |
|---|---|---|
| 4,453,268 A | 6/1984 | Britt |
| 4,454,546 A | 6/1984 | Mori |
| 4,456,931 A | 6/1984 | Toyoda et al. |
| 4,472,740 A | 9/1984 | Doi |
| 4,475,131 A | 10/1984 | Nishizawa et al. |
| 4,476,993 A | 10/1984 | Krout |
| 4,489,351 A | 12/1984 | d'Alayer de Costemore d'Arc |
| 4,496,973 A | 1/1985 | Horikawa et al. |
| 4,527,205 A | 7/1985 | Konishi |
| 4,531,161 A | 7/1985 | Murakoshi |
| 4,541,010 A | 9/1985 | Alston |
| 4,541,021 A | 9/1985 | Konishi et al. |
| 4,544,960 A | 10/1985 | Konishi |
| 4,546,390 A | 10/1985 | Konishi et al. |
| 4,553,170 A | 11/1985 | Aoki et al. |
| 4,564,861 A | 1/1986 | Hishinuma et al. |
| 4,571,638 A | 2/1986 | Schneider et al. |
| 4,573,076 A | 2/1986 | Tisue et al. |
| 4,574,319 A | 3/1986 | Konishi |
| 4,575,752 A | 3/1986 | Honda |
| 4,577,239 A | 3/1986 | Sougen |
| 4,586,160 A | 4/1986 | Amano et al. |
| 4,587,633 A | 5/1986 | Wang et al. |
| 4,605,956 A | 8/1986 | Cok |
| 4,614,966 A | 9/1986 | Yunoki et al. |
| 4,614,977 A | 9/1986 | Kawahara et al. |
| 4,618,235 A | 10/1986 | Ishida et al. |
| 4,620,232 A | 10/1986 | Tisue |
| 4,633,306 A | 12/1986 | Utsugi |
| 4,641,198 A | 2/1987 | Ohta et al. |
| 4,641,203 A | 2/1987 | Miller |
| 4,642,700 A | 2/1987 | Ohta et al. |
| 4,652,944 A | 3/1987 | Tindall |
| 4,656,524 A | 4/1987 | Norris et al. |
| 4,656,525 A | 4/1987 | Norris |
| 4,660,102 A | 4/1987 | Kawakami et al. |
| 4,675,744 A | 6/1987 | Mason |
| 4,675,750 A | 6/1987 | Collins et al. |
| 4,682,212 A | 7/1987 | Inuiya et al. |
| 4,682,248 A | 7/1987 | Schwartz |
| 4,687,944 A | 8/1987 | Mitsuka et al. |
| 4,689,696 A | 8/1987 | Plummer |
| 4,691,253 A | 9/1987 | Silver |
| 4,692,797 A | 9/1987 | Matsumoto |
| 4,698,702 A | 10/1987 | Miyake |
| 4,701,800 A | 10/1987 | Akimoto et al. |
| 4,701,805 A | 10/1987 | Maeshima |
| 4,704,632 A | 11/1987 | Van Den Heuvel |
| 4,706,126 A | 11/1987 | Kondo |
| 4,709,259 A | 11/1987 | Suzuki |
| 4,710,832 A | 12/1987 | Itoh |
| 4,710,875 A | 12/1987 | Nakajima et al. |
| 4,714,962 A | 12/1987 | Levine |
| 4,717,969 A | 1/1988 | Miyake |
| 4,725,897 A | 2/1988 | Konishi |
| 4,729,040 A | 3/1988 | Miyake |
| 4,730,212 A | 3/1988 | Wojcik et al. |
| 4,730,222 A | 3/1988 | Schauffele |
| 4,734,725 A | 3/1988 | Bierman |
| 4,736,244 A | 4/1988 | Shiota et al. |
| 4,736,245 A | 4/1988 | Seto et al. |
| 4,739,400 A | 4/1988 | Veitch |
| 4,739,417 A | 4/1988 | Ogawa |
| 4,740,828 A | 4/1988 | Kinoshita |
| 4,740,833 A | 4/1988 | Shiota et al. |
| 4,746,993 A | 5/1988 | Tada |
| 4,750,032 A | 6/1988 | Nakayama |
| 4,754,333 A | 6/1988 | Nara |
| 4,754,487 A | 6/1988 | Newmuis |
| 4,758,883 A | 7/1988 | Kawahara et al. |
| 4,760,606 A | 7/1988 | Lesnick et al. |
| 4,763,204 A | 8/1988 | Kinoshita et al. |
| 4,764,807 A | 8/1988 | Kimura et al. |
| 4,764,870 A | 8/1988 | Haskin |
| 4,768,110 A | 8/1988 | Dunlap et al. |
| 4,769,694 A | 9/1988 | Oshikoshi |
| 4,769,695 A | 9/1988 | Terashita |
| 4,771,343 A | 9/1988 | Takenaka |
| 4,772,956 A | 9/1988 | Roche et al. |
| 4,774,564 A | 9/1988 | Konishi |
| 4,774,595 A | 9/1988 | Miyake |
| 4,774,600 A | 9/1988 | Baumeister |
| 4,780,756 A | 10/1988 | Shiota et al. |
| 4,782,390 A | 11/1988 | Hayashi et al. |
| 4,782,399 A | 11/1988 | Sato |
| 4,788,565 A | 11/1988 | Masuda et al. |
| 4,789,961 A | 12/1988 | Tindall |
| 4,792,866 A | 12/1988 | Hirobe et al. |
| 4,794,460 A | 12/1988 | Shiota |
| 4,794,468 A | 12/1988 | Murakoshi |
| 4,796,085 A | 1/1989 | Shinada |
| 4,797,746 A | 1/1989 | Ashcraft |
| 4,797,751 A | 1/1989 | Yamaguchi |
| 4,800,448 A | 1/1989 | Kaneko et al. |
| 4,803,554 A | 2/1989 | Pape |
| 4,803,561 A | 2/1989 | Kubota |
| 4,803,568 A | 2/1989 | Miyake et al. |
| 4,805,037 A | 2/1989 | Noble et al. |
| 4,812,922 A | 3/1989 | Minoura et al. |
| 4,814,811 A | 3/1989 | Saito et al. |
| 4,814,876 A | 3/1989 | Horio et al. |
| 4,817,050 A | 3/1989 | Komatsu et al. |
| 4,819,059 A | 4/1989 | Pape |
| 4,821,121 A | 4/1989 | Beaulier |
| 4,821,336 A | 4/1989 | Roye |
| 4,823,809 A | 4/1989 | Gott, Jr. et al. |
| 4,825,293 A | 4/1989 | Kobayashi et al. |
| 4,825,301 A | 4/1989 | Pape et al. |
| 4,825,324 A | 4/1989 | Miyake et al. |
| 4,827,332 A | 5/1989 | Miyake et al. |
| 4,827,341 A | 5/1989 | Akimoto et al. |
| 4,827,347 A | 5/1989 | Bell |
| 4,827,357 A | 5/1989 | Kawakami |
| 4,829,368 A | 5/1989 | Kobayashi et al. |
| 4,829,383 A | 5/1989 | Harase et al. |
| 4,837,626 A | 6/1989 | Nishiyama et al. |
| 4,837,628 A | 6/1989 | Sasaki |
| 4,839,745 A | 6/1989 | Tindall |
| 4,839,747 A | 6/1989 | Fujiwara |
| 4,841,371 A | 6/1989 | Nishiyama et al. |
| 4,843,471 A | 6/1989 | Yazawa et al. |
| 4,847,677 A | 7/1989 | Music et al. |
| 4,849,811 A | 7/1989 | Kleinerman |
| 4,855,779 A | 8/1989 | Ishikawa et al. |
| 4,855,838 A | 8/1989 | Jones et al. |
| 4,858,032 A | 8/1989 | Okada et al. |
| 4,862,360 A | 8/1989 | Kimura et al. |
| 4,868,642 A | 9/1989 | Kaneko |
| 4,868,653 A | 9/1989 | Golin et al. |
| 4,868,677 A | 9/1989 | Tompane |
| 4,872,054 A | 10/1989 | Gray et al. |
| 4,876,590 A | 10/1989 | Parulski |
| 4,876,598 A | 10/1989 | Carlstedt et al. |
| 4,879,601 A | 11/1989 | Buck et al. |
| 4,887,161 A | 12/1989 | Watanabe et al. |
| 4,888,641 A | 12/1989 | Isnardi et al. |
| 4,896,220 A | 1/1990 | Sato et al. |
| 4,897,732 A | 1/1990 | Kinoshita et al. |
| 4,897,735 A | 1/1990 | Oneda |
| 4,899,212 A | 2/1990 | Kaneko et al. |
| 4,899,216 A | 2/1990 | Tatsumi et al. |

| Patent | Date | Name |
|---|---|---|
| 4,903,132 A | 2/1990 | Yamawaki |
| 4,905,092 A | 2/1990 | Koshiishi et al. |
| 4,905,167 A | 2/1990 | Yamaoka et al. |
| 4,907,092 A | 3/1990 | Iwase et al. |
| 4,907,231 A | 3/1990 | Watanabe et al. |
| 4,908,709 A | 3/1990 | Inuiya et al. |
| 4,910,706 A | 3/1990 | Hyatt |
| 4,914,746 A | 4/1990 | Nishi et al. |
| 4,920,423 A | 4/1990 | Shiota |
| 4,924,302 A | 5/1990 | Shiota et al. |
| 4,924,316 A | 5/1990 | Kobayashi et al. |
| 4,928,167 A | 5/1990 | Tatsumi et al. |
| 4,929,971 A | 5/1990 | Imura et al. |
| 4,930,009 A | 5/1990 | Shiota |
| 4,931,863 A | 6/1990 | Tokuda |
| 4,933,773 A | 6/1990 | Shiota et al. |
| 4,935,821 A | 6/1990 | Sano et al. |
| 4,939,588 A | 7/1990 | Ushiro et al. |
| 4,939,642 A | 7/1990 | Blank |
| 4,943,850 A | 7/1990 | Asaida |
| 4,947,271 A | 8/1990 | Nakayama et al. |
| 4,963,903 A | 10/1990 | Cane |
| 4,963,986 A | 10/1990 | Fukuyama et al. |
| 4,965,662 A | 10/1990 | Shiota |
| 4,967,297 A | 10/1990 | Okita et al. |
| 4,972,266 A | 11/1990 | Tani |
| 4,972,267 A | 11/1990 | Kaneko et al. |
| 4,974,092 A | 11/1990 | Kawamura et al. |
| 4,974,197 A | 11/1990 | Blount et al. |
| 4,980,769 A | 12/1990 | Inuiya et al. |
| 4,982,282 A | 1/1991 | Saito et al. |
| 4,982,290 A | 1/1991 | Nishi et al. |
| 4,982,291 A | 1/1991 | Kurahashi et al. |
| 4,985,777 A | 1/1991 | Kawada |
| 4,991,004 A | 2/1991 | Hayashi et al. |
| 4,992,886 A | 2/1991 | Klappert |
| 4,994,912 A | 2/1991 | Lumelsky et al. |
| 4,994,913 A | 2/1991 | Maeshima |
| 4,999,705 A | 3/1991 | Puri |
| 4,999,715 A | 3/1991 | Porcellio et al. |
| 5,006,937 A | 4/1991 | Nonoshita et al. |
| 5,016,107 A | 5/1991 | Sasson et al. |
| 5,018,017 A | 5/1991 | Sasaki et al. |
| 5,018,023 A | 5/1991 | Kubota |
| 5,018,083 A | 5/1991 | Watanabe et al. |
| 5,019,908 A | 5/1991 | Su |
| 5,021,874 A | 6/1991 | Tsugita |
| 5,027,214 A | 6/1991 | Fujimori |
| 5,027,221 A | 6/1991 | Hisatake et al. |
| 5,027,223 A | 6/1991 | Suetaka et al. |
| 5,029,115 A | 7/1991 | Geraci |
| 5,032,291 A | 7/1991 | Sublette |
| 5,032,918 A | 7/1991 | Ota et al. |
| 5,032,927 A | 7/1991 | Watanabe et al. |
| 5,032,930 A | 7/1991 | Suetaka et al. |
| 5,034,804 A | 7/1991 | Sasaki et al. |
| 5,035,633 A | 7/1991 | Kobayashi et al. |
| 5,036,402 A | 7/1991 | Shiota |
| 5,038,392 A | 8/1991 | Morris et al. |
| 5,040,068 A | 8/1991 | Parulski et al. |
| 5,041,905 A | 8/1991 | Hatanaka et al. |
| 5,045,925 A | 9/1991 | Saito |
| 5,045,949 A | 9/1991 | Shiota |
| 5,048,101 A | 9/1991 | Kurosu et al. |
| 5,049,997 A | 9/1991 | Arai |
| 5,050,001 A | 9/1991 | Hatanaka et al. |
| 5,050,009 A | 9/1991 | Takahashi et al. |
| 5,050,088 A | 9/1991 | Buckler et al. |
| 5,051,840 A | 9/1991 | Watanabe et al. |
| 5,053,879 A | 10/1991 | Kubota |
| 5,055,930 A | 10/1991 | Nagasaki et al. |
| 5,057,913 A | 10/1991 | Nagata et al. |
| 5,057,924 A | 10/1991 | Yamada et al. |
| 5,058,185 A | 10/1991 | Morris et al. |
| 5,060,069 A | 10/1991 | Aoki |
| 5,062,010 A | 10/1991 | Saito |
| 5,065,246 A | 11/1991 | Takemoto et al. |
| 5,067,029 A | 11/1991 | Takahashi |
| 5,068,735 A | 11/1991 | Tuchiya et al. |
| 5,068,744 A | 11/1991 | Ito |
| 5,077,612 A | 12/1991 | Megrgardt et al. |
| 5,081,535 A | 1/1992 | Kondo et al. |
| 5,086,345 A | 2/1992 | Nakane et al. |
| 5,091,747 A | 2/1992 | Tsai |
| 5,091,787 A | 2/1992 | Watanabe et al. |
| 5,093,731 A | 3/1992 | Watanabe et al. |
| 5,093,750 A | 3/1992 | Park et al. |
| 5,097,344 A | 3/1992 | Aoki et al. |
| 5,099,262 A | 3/1992 | Tanaka et al. |
| 5,099,846 A | 3/1992 | Hardy |
| 5,101,280 A | 3/1992 | Moronaga et al. |
| 5,105,284 A | 4/1992 | Sakata et al. |
| 5,111,283 A | 5/1992 | Nagasawa et al. |
| 5,111,288 A | 5/1992 | Blackshear |
| 5,115,319 A | 5/1992 | Arai et al. |
| 5,119,081 A | 6/1992 | Ikehira |
| 5,121,218 A | 6/1992 | Miyake et al. |
| 5,122,880 A | 6/1992 | Nagano |
| 5,124,692 A | 6/1992 | Sasson |
| 5,124,814 A | 6/1992 | Takahashi et al. |
| 5,126,857 A | 6/1992 | Watanabe et al. |
| 5,128,769 A | 7/1992 | Arai et al. |
| 5,128,773 A | 7/1992 | Sato |
| 5,130,813 A | 7/1992 | Oie et al. |
| 5,134,434 A | 7/1992 | Inoue et al. |
| 5,134,487 A | 7/1992 | Taguchi et al. |
| 5,144,425 A | 9/1992 | Joseph |
| 5,146,325 A | 9/1992 | Ng |
| 5,146,353 A | 9/1992 | Isoguchi et al. |
| 5,153,729 A | 10/1992 | Saito |
| 5,153,730 A | 10/1992 | Nagasaki et al. |
| 5,161,025 A | 11/1992 | Nakao |
| 5,162,908 A | 11/1992 | Kim |
| 5,164,831 A | 11/1992 | Kuchta et al. |
| 5,164,980 A | 11/1992 | Bush et al. |
| 5,165,012 A | 11/1992 | Crandall et al. |
| 5,166,782 A | 11/1992 | Asaida |
| 5,168,375 A | 12/1992 | Reisch et al. |
| 5,170,262 A | 12/1992 | Kinoshita et al. |
| 5,170,264 A | 12/1992 | Saito et al. |
| 5,177,614 A | 1/1993 | Kawaoka et al. |
| 5,184,229 A | 2/1993 | Saito et al. |
| 5,189,522 A | 2/1993 | Stephenson, III |
| 5,200,863 A | 4/1993 | Orii |
| 5,202,767 A | 4/1993 | Dozier et al. |
| 5,206,730 A | 4/1993 | Sakai |
| 5,208,672 A | 5/1993 | Konishi et al. |
| 5,212,770 A | 5/1993 | Smith et al. |
| 5,214,781 A | 5/1993 | Miki et al. |
| 5,216,511 A | 6/1993 | Tani |
| 5,216,516 A | 6/1993 | Tanaka et al. |
| 5,216,518 A | 6/1993 | Yamagami |
| 5,218,455 A | 6/1993 | Kristy |
| 5,220,436 A | 6/1993 | Aosaki et al. |
| 5,223,954 A | 6/1993 | Miyakawa et al. |
| 5,225,908 A | 7/1993 | Lee |
| 5,227,863 A | 7/1993 | Bilbrey et al. |
| 5,229,864 A | 7/1993 | Moronaga et al. |
| 5,231,501 A | 7/1993 | Sakai |
| 5,231,518 A | 7/1993 | Itoh et al. |
| 5,231,549 A | 7/1993 | Morehouse et al. |
| 5,231,585 A | 7/1993 | Kobayashi et al. |

| | | | | | |
|---|---|---|---|---|---|
| 5,233,411 A | 8/1993 | Nam et al. | 5,631,696 A | 5/1997 | Tanaka et al. |
| 5,239,759 A | 8/1993 | Dudek | 5,631,701 A | 5/1997 | Miyake |
| 5,241,659 A | 8/1993 | Parulski et al. | 5,631,739 A | 5/1997 | Kawaoka |
| 5,247,651 A | 9/1993 | Clarisse | 5,633,678 A | 5/1997 | Parulski et al. |
| 5,249,053 A | 9/1993 | Jain | 5,633,723 A | 5/1997 | Sugiyama et al. |
| 5,251,020 A | 10/1993 | Sugiyama | 5,636,315 A | 6/1997 | Sugiyama et al. |
| 5,251,036 A | 10/1993 | Kawaoka et al. | 5,659,354 A | 8/1997 | Oosaka |
| 5,253,062 A | 10/1993 | Ohta | 5,661,823 A | 8/1997 | Yamauchi et al. |
| 5,255,211 A | 10/1993 | Redmond | 5,668,597 A | 9/1997 | Parulski et al. |
| 5,262,868 A | 11/1993 | Kaneko et al. | 5,668,914 A | 9/1997 | Inuiya et al. |
| 5,270,831 A | 12/1993 | Parulski et al. | 5,680,500 A | 10/1997 | Takahashi et al. |
| 5,272,524 A | 12/1993 | Nagumo et al. | 5,682,202 A | 10/1997 | Watanabe et al. |
| 5,274,457 A | 12/1993 | Kobayashi et al. | 5,682,458 A | 10/1997 | Funazaki |
| 5,280,397 A | 1/1994 | Rhodes | 5,686,958 A | 11/1997 | Shibasaki et al. |
| 5,283,633 A | 2/1994 | Tabei | 5,694,168 A | 12/1997 | Toji |
| 5,287,266 A | 2/1994 | Malec et al. | 5,699,109 A | 12/1997 | Nishimura et al. |
| 5,293,236 A | 3/1994 | Adachi et al. | 5,706,050 A | 1/1998 | Nishimura et al. |
| 5,301,262 A | 4/1994 | Kashiwagi | 5,706,387 A | 1/1998 | Makishima |
| 5,319,449 A | 6/1994 | Saito et al. | 5,710,597 A | 1/1998 | Tamaki et al. |
| 5,319,450 A | 6/1994 | Tamayama et al. | 5,717,839 A | 2/1998 | Ichikawa |
| 5,321,831 A | 6/1994 | Hirose | 5,724,101 A | 3/1998 | Haskin |
| 5,327,156 A | 7/1994 | Masukane et al. | 5,726,910 A | 3/1998 | Toma |
| 5,329,361 A | 7/1994 | Matsui et al. | 5,734,427 A | 3/1998 | Hayashi |
| 5,339,368 A | 8/1994 | Higgins-Luthman et al. | 5,739,376 A | 4/1998 | Bingel |
| 5,359,427 A | 10/1994 | Sato | 5,740,312 A | 4/1998 | Tanaka et al. |
| 5,376,964 A | 12/1994 | Soga et al. | 5,751,349 A | 5/1998 | Matsui et al. |
| 5,379,376 A | 1/1995 | Bednowitz | 5,754,221 A | 5/1998 | Nishimura et al. |
| 5,396,281 A | 3/1995 | Maeda | 5,757,022 A | 5/1998 | Kobayashi et al. |
| 5,396,288 A | 3/1995 | Tsugita et al. | 5,761,393 A | 6/1998 | Enomoto |
| 5,416,515 A | 5/1995 | Arai et al. | 5,764,286 A | 6/1998 | Kawamura et al. |
| 5,420,635 A | 5/1995 | Konishi et al. | 5,767,904 A | 6/1998 | Miyake |
| 5,428,389 A | 6/1995 | Ito et al. | 5,767,983 A | 6/1998 | Terashita |
| 5,430,556 A | 7/1995 | Ito | 5,768,444 A | 6/1998 | Nishimura |
| 5,434,618 A | 7/1995 | Hayashi et al. | 5,777,667 A | 7/1998 | Miyake et al. |
| 5,434,623 A | 7/1995 | Coleman et al. | 5,777,673 A | 7/1998 | Yoshikawa |
| 5,436,656 A | 7/1995 | Soga et al. | 5,777,675 A | 7/1998 | Miida et al. |
| 5,438,367 A | 8/1995 | Yamamoto et al. | 5,784,176 A | 7/1998 | Narita |
| 5,444,482 A | 8/1995 | Misawa et al. | 5,786,904 A | 7/1998 | Narita |
| 5,448,292 A | 9/1995 | Matsui et al. | 5,790,280 A | 8/1998 | Terashita |
| 5,454,067 A | 9/1995 | Tsai | 5,790,707 A | 8/1998 | Tanaka et al. |
| 5,454,096 A | 9/1995 | Otsuka et al. | 5,796,490 A | 8/1998 | Shidara et al. |
| 5,455,685 A | 10/1995 | Mori | 5,808,667 A | 9/1998 | Sugiyama |
| 5,463,419 A | 10/1995 | Saito | 5,809,208 A | 9/1998 | Komori |
| 5,463,470 A | 10/1995 | Terashita et al. | 5,822,082 A | 10/1998 | Sato et al. |
| 5,467,198 A | 11/1995 | Aosaki et al. | 5,825,417 A | 10/1998 | Yoshida |
| 5,473,370 A | 12/1995 | Moronaga et al. | 5,838,363 A | 11/1998 | Saito |
| 5,473,441 A | 12/1995 | Inuiya et al. | 5,877,810 A | 3/1999 | Inuiya et al. |
| 5,475,539 A | 12/1995 | Orii | 5,883,698 A | 3/1999 | Kimura |
| 5,479,206 A | 12/1995 | Ueno et al. | 5,903,677 A | 5/1999 | Kosugi et al. |
| 5,481,364 A | 1/1996 | Ito | 5,905,528 A | 5/1999 | Kodama |
| 5,493,335 A | 2/1996 | Parulski et al. | 5,905,529 A | 5/1999 | Inuiya et al. |
| 5,504,584 A | 4/1996 | Soeda | 5,933,183 A | 8/1999 | Enomoto et al. |
| 5,506,619 A | 4/1996 | Adams, Jr. et al. | 5,956,084 A | 9/1999 | Moronaga et al. |
| 5,512,947 A | 4/1996 | Sawachi et al. | 5,960,155 A | 9/1999 | Fukuoka et al. |
| 5,517,241 A | 5/1996 | Adachi et al. | 5,966,173 A | 10/1999 | Inuiya et al. |
| 5,528,274 A | 6/1996 | Hyodo | 5,982,984 A | 11/1999 | Inuiya |
| 5,528,291 A | 6/1996 | Oda | 5,992,743 A | 11/1999 | Suemoto et al. |
| 5,528,293 A | 6/1996 | Watanabe | 5,999,276 A | 12/1999 | Narita |
| 5,546,126 A | 8/1996 | Yajima et al. | 6,020,982 A | 2/2000 | Yamauchi et al. |
| 5,561,531 A | 10/1996 | Funazaki | 6,025,934 A | 2/2000 | Matsumoto |
| 5,565,913 A | 10/1996 | Matsui et al. | 6,046,765 A | 4/2000 | Nishimura et al. |
| 5,576,758 A | 11/1996 | Arai et al. | 6,084,632 A | 7/2000 | Inuiya et al. |
| 5,579,049 A | 11/1996 | Shimaya et al. | 6,084,633 A | 7/2000 | Gouhara et al. |
| 5,579,116 A | 11/1996 | Sugiyama et al. | 6,091,881 A | 7/2000 | Kamikubota |
| 5,579,132 A | 11/1996 | Takahashi et al. | 6,094,217 A | 7/2000 | Nishimura |
| 5,589,879 A | 12/1996 | Saito et al. | 6,128,038 A | 10/2000 | Nakajima |
| 5,589,889 A | 12/1996 | Kawaoka | 6,147,706 A | 11/2000 | Inuiya et al. |
| 5,608,455 A | 3/1997 | Oda | 6,148,150 A | 11/2000 | Yajima et al. |
| 5,625,411 A | 4/1997 | Inuiya et al. | 6,151,445 A | 11/2000 | Nishimura |
| 5,625,415 A | 4/1997 | Ueno et al. | 6,157,459 A | 12/2000 | Shiota et al. |
| 5,627,587 A | 5/1997 | Murata et al. | 6,160,577 A | 12/2000 | Nishimura et al. |

| | | |
|---|---|---|
| 6,172,770 B1 | 1/2001 | Inoue |
| 6,181,374 B1 | 1/2001 | Saito et al. |
| 6,181,880 B1 | 1/2001 | Ishihara et al. |
| 6,191,811 B1 | 2/2001 | Nishimura et al. |
| 6,192,190 B1 | 2/2001 | Tojo et al. |
| 6,195,469 B1 | 2/2001 | Nishioka et al. |
| 6,198,526 B1 | 3/2001 | Ohtsuka |
| 6,208,380 B1 | 3/2001 | Misawa |
| 6,211,973 B1 | 4/2001 | Takemoto |
| 6,211,974 B1 | 4/2001 | Haneda |
| 6,212,331 B1 | 4/2001 | Fukuoka et al. |
| 6,215,564 B1 | 4/2001 | Okino |
| 6,222,985 B1 | 4/2001 | Miyake |
| 6,222,986 B1 | 4/2001 | Inuiya |
| 6,226,105 B1 | 5/2001 | Fukushi |
| 6,249,313 B1 | 6/2001 | Nishi |
| 6,256,063 B1 | 7/2001 | Saito et al. |
| 6,278,533 B1 | 8/2001 | Takemoto |
| 6,281,992 B1 | 8/2001 | Kondo |
| 6,297,873 B1 | 10/2001 | Furuya |
| 6,307,590 B1 | 10/2001 | Yoshida |
| 6,314,248 B1 | 11/2001 | Ohmura et al. |
| 6,323,934 B1 | 11/2001 | Enomoto |
| 6,330,051 B1 | 12/2001 | Takanashi |
| 6,331,903 B1 | 12/2001 | Nakazawa et al. |
| 6,333,778 B1 | 12/2001 | Katakura et al. |
| 6,334,027 B1 | 12/2001 | Fukuoka et al. |
| 6,337,712 B1 | 1/2002 | Shiota et al. |
| 6,337,951 B1 | 1/2002 | Nakamura |
| 6,339,484 B1 | 1/2002 | Arai |
| 6,339,485 B1 | 1/2002 | Yamada |
| 6,340,989 B1 | 1/2002 | Oda |
| 6,344,907 B1 | 2/2002 | Watanabe et al. |
| 6,346,998 B2 | 2/2002 | Shiota et al. |
| 6,351,286 B1 | 2/2002 | Ikami et al. |
| 6,351,291 B1 | 2/2002 | Asano |
| 6,351,606 B1 | 2/2002 | Yamazaki |
| 6,356,339 B1 | 3/2002 | Enomoto |
| 6,366,366 B1 | 4/2002 | Nakamura |
| 6,397,006 B1 | 5/2002 | Sasaki et al. |
| 6,407,829 B1 | 6/2002 | Nakamura |
| 6,415,102 B1 | 7/2002 | Fuji et al. |
| 6,417,913 B2 | 7/2002 | Tanaka |
| 6,421,504 B1 | 7/2002 | Saito et al. |
| 6,427,049 B2 | 7/2002 | Fukuoka et al. |
| 6,430,372 B2 | 8/2002 | Ishihara et al. |
| 6,433,821 B1 | 8/2002 | Gouhara et al. |
| 6,434,337 B1 | 8/2002 | Misawa |
| 6,445,819 B1 | 9/2002 | Kinjo |
| 6,453,122 B1 | 9/2002 | Misawa et al. |
| 6,456,325 B1 | 9/2002 | Hayashi |
| 6,459,511 B1 | 10/2002 | Haneda |
| 6,473,198 B1 | 10/2002 | Matama |
| 6,480,300 B1 | 11/2002 | Aoyama |
| 6,496,280 B2 | 12/2002 | Ishikawa et al. |
| 6,496,658 B2 | 12/2002 | Chino et al. |
| 6,501,505 B1 | 12/2002 | Kawamura et al. |
| 6,504,952 B1 | 1/2003 | Takemura et al. |
| 6,507,704 B2 | 1/2003 | Enomoto |
| 6,515,766 B1 | 2/2003 | Matama |
| 6,519,046 B1 | 2/2003 | Kinjo |
| 6,522,353 B1 | 2/2003 | Saito et al. |
| 6,522,391 B2 | 2/2003 | Katakura et al. |
| 6,525,767 B2 | 2/2003 | Saito et al. |
| 6,525,836 B1 | 2/2003 | Ito et al. |
| 6,526,232 B1 | 2/2003 | Mizumura |
| 6,529,236 B1 | 3/2003 | Watanabe |
| 6,530,637 B2 | 3/2003 | Sawano |
| 6,535,248 B1 | 3/2003 | Hatakeyama |
| 6,539,169 B1 | 3/2003 | Tsubaki et al. |
| 6,546,187 B1 | 4/2003 | Miyazaki et al. |
| 6,549,231 B1 | 4/2003 | Matsui |
| 6,549,307 B1 | 4/2003 | Makishima et al. |
| 6,559,923 B2 | 5/2003 | Iwaki |
| 6,560,410 B2 | 5/2003 | Ichikawa et al. |
| 6,563,531 B1 | 5/2003 | Matama |
| 6,567,125 B1 | 5/2003 | Shimizu |
| 6,567,611 B1 | 5/2003 | Soga |
| 6,567,983 B1 | 5/2003 | Shiimori |
| 2001/0033734 A1 | 10/2001 | Hoda et al. |

FOREIGN PATENT DOCUMENTS

| | | |
|---|---|---|
| DE | 3342004 A1 | 6/1984 |
| DE | 3809677 A1 | 3/1988 |
| DE | 3809676 A1 | 12/1988 |
| DE | 3809677 A1 | 12/1988 |
| EP | 0105213 A2 | 4/1984 |
| EP | 0411086 B1 | 8/1984 |
| EP | 0167327 A2 | 1/1986 |
| EP | 0226959 A2 | 7/1987 |
| EP | 0249113 A2 | 12/1987 |
| EP | 0266086 A2 | 5/1988 |
| EP | 0269463 A2 | 6/1988 |
| EP | 0286857 B1 | 10/1988 |
| EP | 0289944 A1 | 11/1988 |
| EP | 0295691 B1 | 12/1988 |
| EP | 0322683 A2 | 7/1989 |
| EP | 0323194 A2 | 7/1989 |
| EP | 0 323 194 A3 | 7/1989 |
| EP | 0338957 B1 | 10/1989 |
| EP | 90303076.5 | 3/1990 |
| EP | 0366474 A1 | 5/1990 |
| EP | 0371961 A2 | 6/1990 |
| EP | 0411086 B1 | 2/1991 |
| EP | 0218291 B1 | 3/1991 |
| EP | 0421772 B1 | 4/1991 |
| EP | 92902180 | 8/1993 |
| EP | 0156923 B1 | 12/1993 |
| EP | 0390421 B1 | 7/1994 |
| FR | 2637437 | 4/1990 |
| FR | 2645382 | 10/1990 |
| GB | 2047041 A | 11/1980 |
| GB | 2059713 A | 4/1981 |
| GB | 2096429 A | 10/1982 |
| GB | 2224905 A | 5/1990 |
| GB | 2234647 A | 2/1991 |
| JP | 53-117944 | 10/1978 |
| JP | 57-88506 | 6/1982 |
| JP | 57-185777 | 11/1982 |
| JP | 58-3384 | 1/1983 |
| JP | 58-29278 | 2/1983 |
| JP | 58-29279 | 2/1983 |
| JP | 58-121091 | 7/1983 |
| JP | 58-218004 | 12/1983 |
| JP | 59-58570 | 4/1984 |
| JP | 59-064874 | 4/1984 |
| JP | 60-80897 | 5/1985 |
| JP | 60-84629 | 5/1985 |
| JP | 60-134574 | 7/1985 |
| JP | 60-201478 | 10/1985 |
| JP | 61-242372 | 10/1986 |
| JP | 61-269565 | 11/1986 |
| JP | 62-43393 | 9/1987 |
| JP | 62-218059 | 9/1987 |
| JP | 62-237341 | 10/1987 |
| JP | 62-260223 | 11/1987 |
| JP | 63-45760 | 2/1988 |
| JP | 63-80677 | 4/1988 |
| JP | 63-163974 | 7/1988 |
| JP | 63-169886 | 7/1988 |
| JP | 63-274289 | 11/1988 |
| JP | 63-281595 | 11/1988 |

| | | |
|---|---|---|
| JP | 63-284987 | 11/1988 |
| JP | 63-286078 | 11/1988 |
| JP | 01-007138 | 1/1989 |
| JP | 01-026229 | 1/1989 |
| JP | 01-026230 | 1/1989 |
| JP | 64-16081 | 1/1989 |
| JP | 64-016081 | 1/1989 |
| JP | 64-047177 | 2/1989 |
| JP | 01-073470 | 3/1989 |
| JP | 64-60071 | 3/1989 |
| JP | 64-64184 | 3/1989 |
| JP | 64-66867 | 3/1989 |
| JP | 64-84980 | 3/1989 |
| JP | 64-060071 | 3/1989 |
| JP | 1-114286 | 5/1989 |
| JP | -10114834 | 5/1989 |
| JP | 1-151884 | 6/1989 |
| JP | 01-159760 | 6/1989 |
| JP | 1-190190 | 7/1989 |
| JP | 1-198865 | 8/1989 |
| JP | 1-221989 | 9/1989 |
| JP | 1-227287 | 9/1989 |
| JP | 1-243686 | 9/1989 |
| JP | 1-248785 | 10/1989 |
| JP | 1-251285 | 10/1989 |
| JP | 1-278183 | 11/1989 |
| JP | 01-295330 | 11/1989 |
| JP | 02-025972 | 1/1990 |
| JP | 02-051172 | 2/1990 |
| JP | 2-111176 | 4/1990 |
| JP | 2-125572 | 5/1990 |
| JP | 02-125586 | 5/1990 |
| JP | 2-146874 | 6/1990 |
| JP | 2-172382 | 7/1990 |
| JP | 2-172392 | 7/1990 |
| JP | 2-177179 | 7/1990 |
| JP | 2-183675 | 7/1990 |
| JP | 2-186882 | 7/1990 |
| JP | 02-200235 | 8/1990 |
| JP | 2-202782 | 8/1990 |
| JP | 2-208779 | 8/1990 |
| JP | 2-211780 | 8/1990 |
| JP | 02-244283 | 9/1990 |
| JP | 2-257780 | 10/1990 |
| JP | 02-263267 | 10/1990 |
| JP | 2-266668 | 10/1990 |
| JP | 3-18393 | 3/1991 |
| JP | 3-501550 | 4/1991 |
| JP | 3-105637 | 5/1991 |
| JP | 3-149982 | 6/1991 |
| JP | 03-250485 | 11/1991 |
| JP | 3-267882 | 11/1991 |
| JP | 3-272289 | 12/1991 |
| JP | 03-282678 | 12/1991 |
| JP | 4-501045 | 2/1992 |
| JP | 4-159874 | 6/1992 |
| JP | 4-159884 | 6/1992 |
| JP | 04-089982 | 8/1992 |
| JP | 04-212582 | 8/1992 |
| JP | 5-25221 | 4/1993 |
| JP | 5-505025 | 7/1993 |
| JP | 6-350886 | 12/1994 |
| JP | 7-203352 | 8/1995 |
| JP | 7-274108 | 10/1995 |
| JP | 08-087604 | 4/1996 |
| JP | 3026585 | 5/1996 |
| JP | 2557862 | 9/1996 |
| JP | 08-242421 | 9/1996 |
| JP | 10-105006 | 4/1998 |
| JP | 10-114127 | 5/1998 |
| JP | 10-240079 | 9/1998 |
| JP | 10-258562 | 9/1998 |
| JP | 10-283374 | 10/1998 |
| JP | 2950615 | 7/1999 |
| JP | 3066531 | 5/2000 |
| WO | WO 85/04989 | 11/1985 |
| WO | WO 88/06824 | 9/1988 |
| WO | PCT/US89/04953 | 11/1989 |
| WO | PCT/AT90/00017 | 8/1990 |
| WO | WO 90/09717 | 8/1990 |

OTHER PUBLICATIONS

Notification of Reasons for Rejection from Japanese Patent Office, Mailing No. 431877, Mailing Date Nov. 30, 2005 (English translation only).
Canon 20940–20947, Adobe Version 2.5 For MacIntosh and Windows, Adobe Systems Inc., 1993.
Canon 20470–20489, Miscellaneous On–Line Articles Re Thunderware.
Canon 20490–20493 "Handy Scanners For Under $700", Electronic Learning, Oct. 1991, pp. 24, 26, 28.
Canon 20894–20900 "Bringing the Outside World Into a Macintosh", BYTE, Oct. 1988, pp. 194–199.
Canon 21785–21786, Advertisement, FUJIX Memory Card Camera DS–X, FUJIX DS–1P, The World's First Digital Still Camera, Fuji Film I & I.
Canon 21792, Japanese Advertisement, Fujix Memorycard Camera DS–X.
Canon 20852–20874, These are actually 6 separate documents: 1. "Image Processing With Personal Computers", Electronic Imaging, Mar. 1985, pp. 44–51, 2. "Pictures By Computer", David Laycock, 3. "A PC–Based Medical Imaging Workstation", Tsui et al., SPIE vol. 767 Medical Imaging, 1987, 4. Misc. Abstracts, EEA 1989, vol. 92, No. 1095, p. 1369, 5. Misc. Abstracts, EEA 1989, vol. 92, No. 1096, 6. "A Quick Look At Quick Capture", West et al., BYTE, Dec. 1988, pp. 199–204.
Canon 20118–20469, Image Scanners For Desktop Publishers, Glover, Windcrest Books, 1990.
Canon 20878–20882, "On The Other Hand Five Affordable MAC Scanners", Holzberg, inCider, Jan. 1991, pp. 55–58.
Canon 20883–20889, "Reel–World Images", Wallace, inCider, Jul. 1989, pp. 40–45.
Canon 20875–20877, "Picture This Thunderscan", Ryan, inCider, Jan. 1988, pp. 26, 29.
Canon 20497–20498, News Briefs, InfoWorld, Aug. 17, 1987, vol. 9, Issue 23, pp. 21–22.
Canon 20499–20500, InfoWorld, Mar. 17, 1988, pp. 47–48.
Canon 20501–20502, InfoWorld, Mar. 9, 1987.
Canon 20504–20506, Info World, Aug. 16, 198?, vol. 7, Issue 24.
Canon 21787–21791, 5 page Japanese article, Oct. 17, 1989.
Canon 21755–21757, Japanese article, Nikkel Electronics, Apr. 17, 1989 (No. 471), p. 111.
Canon 21758–21759, Photograph from Nikkel Electronics, Apr. 17, 1989, No. 471.
Canon 20921–20922, "Imaging Tools Coming To Mac", Perrow, MacWeek, Oct. 11, 1988, p. 8.
Canon 20923–20925, "LightningScan Pro 256", Macworld, Jun. 1992, p. 224.
Canon 20890–20891, "LightningScan Portable", Macworld, Dec. 1993, p. 84.
Canon 20892–20893, "New Image Ships Sheet–Fed Scanners", MacWeek, Nov. 1, 1988, p. 14.
Canon 20926–20936, "The Reading Edge", Meng, Macworld, Feb. 1989, pp. 170–179.

Canon 20937–20939, "LightningScan Compact", Nielsen, Macworld, Dec. 1991, pp. 172–173.
Canon 19540–19543, News From Thunderware, vol. 2, No. 1, Thunderware, Inc., 1986.
Canon 19544–19560, Imagewriter II Instructions, Errata, Supplementary Information, Thunderware, Inc., pp. A–2 through A–16.
Canon 19561–19652, ThunderScan User's Guide, Thunderware, Inc., 1984–1985.
Canon 22061, Japanese Patent Abstracts, 115 E 500.
Canon 20494–20496, "Survey Shows Drop in Venture Capital Spending", Lyons, PC Week, Dec. 16, 1987, p. 144.
Canon 22304–22312, "Tele–Document Terminal—Electronic Filing Terminal for INS Model System", Suzuki et al., Review of the Electrical Communication Laboratories, vol. 33, No. 2, 1985.
Canon 19539, "Tap Photoshop's Full Power", Advertisement, Macintosh/Desktop Publishing.
Canon 20506–20851 and 19417–19538, The Official Adobe Photoshop Handbook, Biedny et al., Bantam Books, 1991.
Canon 19653–19746, Typist Owner's Manual, Caere Corporation, 1990, 1991.
Undated Subject Matter Search Report, Validity Search— U.S. 5,138,459.
Foreign Patent Research (Regarding EP 0411086) in Japanese and German.
The Big Show, Electronic Still Cameras Are on the March, Popular Photography, Dec. 1988, pp. 94–95.
Chart from Imaging Research Center in Japanese with English translation.
Miscellaneous Camera Photography.
"What's New Hardware—Peripherals Digitizing Images Made Simple", re EDC–1000, BYTE vol. 4,No. 3, p. 66, Mar. 1, 1989.
Article re EDC–1000, Astronomy, vol. 17, No. 5, p. 115, May 1989.
Miscellaneous articles regarding EDC–1000, Mar. 1989.
MegaVision's news release for a publication processing system (1988).
MegaVision New, Fully Integrated System Provides High Resolution Image Acquisition and Processing, 1987.
Press Release re Westinghouse/MegaVision 2048×2048 Imaging System, Sep. 1986.
Canon Xapshot Still Video Camera RC–250 Manual and associated documentation.
E–mail from David Lubitz, Feb. 5, 2003.
Canon Internal Document in Japanese re Roberts Patent, Apr. 20, 1994.
Letter to Harada–san from David Lubitz re Invalidity, Dec. 26, 2001.
Letter to Harada–san from David Lubitz re Invalidity Case Assessment, Feb. 8, 2002.
Letter to Tanami–san from David Lubitz re Draft Case Assessment on Non–Infringement, Mar. 23, 2002.
Letter to Harada–san from David Lubitz re Invalidity Case and Prior Art, Jan. 13, 2003.
Letter to Harada–san from David Lubitz re Invalidity, Feb. 7, 2003.
Dycam Notebook, starting date May 19, 1988.
Tessera Professional Filmless Photography, MegaVision brochure.
High Resolution TV Camera ETV–2000, MegaVision.
Processing High Resolution Digital Image,MegaVision, Electronic Imaging, R. Colvin and L. Watson, Aug. 1994.
Introducing the 'Next Generation Image Processor' MegaVision's 1024 XM, MegaVision brochure.
MegaVision 1024 XM brochure (overview, features).
Tessera Filmless Photography, About This Picture, MegaVision.
MegaVision From Concept To Completion, brochure.
MegaVision New Electronic Pre–Press System, Accelerate Your Color Capture, brochure.
The Tessera Digital Photography System, Practical Uses of Digital Photography in the Photo Studio, Tom Holzinger, 1989–1990.
Getting the Picture . . . , Filmless Photography, MegaVision.
Tessera photographs, MegaVision.
If You Could Design . . . , MegaVision brochure 1987–1988.
Pre–, The Authority on Prepress Technology, Bridging Production and Design, and associated documentation, Jan. 1990.
Canon Still Video System, RC–570 SV MAC Kits, advertisement.
Still Video Camera RC–570, The Next Step in Photography, brochure, Canon Inc., 1992.
Canon, Still Video System for Windows SV–PC Still Video Digitizer, Instructions, 1993.
Canon, Still Video Camera RC–760, Instructions.
Dycam Inc., Packing Sheet for Dycam Model 1, Feb. 27, 1991.
Dycam Model 1 Digital Still Camera, Problems You May Encounter, Feb. 8, 1991.
Dycam Model 1 Digital Still Camera User Manual Dycam Macintosh Software For Users of Apple Macintosh Computers Version 2.1, Dycam Inc., 1992.
Array Technologies AS–1 Documentation Excerpts Version: 0.9, including Price List and Press Release, Aug. 1990.
Draft User's Manual for Macintosh Software for Dycam Model 1 Digital Still Camera, PhotoLink (Version beta5), Dycam Inc., 1991.
Draft User's Manual for Dycam Model 1 Digital Still Camera, DOS Utilities (Version 0.40, Dycam Inc. 1991.
Dycam Notebook.
Quotation Prepared for MegaVision PMSI for the 1024XP System, Mar. 31, 1988.
Dycam Model 1 Technical Drawings, Mar. 19, 1992.
E–mail re St. Clair, Dec. 12, 2001.
E–mail re St. Clair, Dec. 14, 2001.
E–mail re Attaches claim chart, Jan. 11, 2002.
E–mail re St. Clair, Jan. 29, 2002.
Notes re Meeting with Canon—St. Clair, Dec. 11, 2001.
Faxes re Requests memo on proper interpretation of claimed word. Attaches memo from Kazuo Tanami to David Lubitz, Nov. 30, 2001.
Canon Digital Camera PowerShot 600 User's Manual, Canon Computer Systems, Inc., 1996.
Canon Photo Mode, You also can make your ZR50MC a still camera by switching to Photo Mode., web page.
Electronic Converter for Cameras is Big Breakthrough for Kodak, John Larish, Democrat & Chronicle, p. D10, Oct. 10, 1990.
Still Video, Portable electronic recording, L. Andrew Mannheim, pp. 58–59.
Kodak Hawkey II Imaging Accessory, High–Definition Electronic Still Imaging, Eastman Kodak Company, 1990.

Photokina '88 Report, 20th Worlds's Fair of Imaging Systems, Cologne, West Germany, Oct. 5–11, 1988, Prepared by Business Research & Technical Intelligence (Photo Research Labs), Oct. 5–11, 1988.

Personal Computer Cameras Inc. announces digital camera product, Anthony Kelly, Feb. 2, 1993.

Fax from Marc Roberts to Anthony Kelly, Feb. 17, 1993.

Technical Support Package, Digital Electronic Still Camera, NASA Tech Briefs, MSC–21797, Jun. 1993.

Letter with enclosures from Richard Kelly to Mel Witmer, Jun. 21, 1988.

Small Print Scanner.

Kodak Professional DCS 100 Digital Camera, Product Information and associated documentation, Kodak, 1989/Jan. 1991.

GCS&S–KP, WorldWide Service Discontinuance: DCS100, Jan. 13, 2004.

KPro Digital—DCS Cameras Comparison Matrix, Product Information, Jan. 15, 2004.

Critical technologies for electronic still imaging systems, M. Kriss, K. Parulski and D. Lewis, SPIE vol. 1082 Applications fo Electronic Imaging (1989), pp. 157–184.

Optimized design for a single–sensor color electronic camera system, J. A. Weldy, SPIE vol. 1071 Optical Sensors and Electronic Photograph (1989), pp. 300–308.

Introduction to New Products, FUJIX Video Camera/Processor FV–5000, Shinseihin Shokai, Fuji Film, vol. 36, pp. 14–17, Oct. 1988 (English translation only).

New Product Trial Report: Sony sound Mavica, Akira Naito, Shashin Kogyo, vol. 47, pp. 19–21, Dec. 1989 (English translation only).

Toshiba and Fuji Film Market a Digital Still Camera System for Commercial Usera, Shashin Kogyo, vol. 47, at p. 33, Dec. 1989 (English translation only).

Electric Eye, Electronic Still Camera—Fall, 1989, Sumihisa Hashiguchi, Shashin Kogyo, vol. 47, pp. 98–99, Dec. 1989 (English translation only).

Digital Still Camera, Sumihisa Hashiguchi, Shashin Kogyo, vol. 47, pp. 108–109, 1989 (English translation only).

Picture and Data Compression—Part Two, Sumihisa Hashiguchi, Shashin Kogyo, vol. 47, No. 7, pp. 107–107, 1989 (English translation only).

Memory Card Camera, Sumihisa Hashiguchi, Shashin Kogyo, vol. V8 (1), pp. 52–53, 1990 (English translation only).

Electric Eye, Digital Still Camera (2), Sumihisa Hashiguchi, Shashin Kogyo, vol. 48, No. 4, pp. 60–61, 1990 (English translation only).

Electronic Still Camera System, Ohnishi, Nippon Shashin Gak., vol. 46 (3), pp. 184–189 (English translation only).

Sony, Canon, Copal and Matsushita, Electronic Still Camera Performance Comparison, Shashin Kogyo, vol. 42 (12), pp. 101–103, 1984 (English translation only).

An Image Pickup System of Electronic Still Camera, Yuji Ide, Terebijion Gakkai Shi, vol. 39, No. 9, pp. 765–770, 1985 (English translation only).

Electronic Still Camera System: 2–1. Technical Aspect and Future Trend, Keinosuke Murakami, Terebijion Gaddai, vol. 39, No. 9, pp. 750(6)–753(10), 1985 (English translation only).

CCD Color Camera With Electronic Shutter, Kazuhiza Umise, Terebijion Gakkai Zenkoku Taikai Yokoshu, pp. 99–100, Aug. 1986 (English translation only).

Future Trends in Electronic Still Cameras (Part 1), Sumihisa Hashiguchi, Shashin Kogyo, vol. 44, No. 10, pp. 98–99, Oct. 1986 (English translation only).

Future Direction of Electronic Still Cameras (Part 2), Sumihisa Hashiguchi, Shashin Kogyo, vol. 44(11), pp. 89–91, Nov. 1986 (English translation only).

The Future Course of the Electronic Still Camera: Part 3 Sumihisa Hashiguchi, Shashin Kogyo, vol. 44, No. 12, pp. 100–101, 1986 (English translation only).

Electronic Still Cameras—Future Trends Part 5, Sumihisa Hashiguchi, Shashin Kogyo, pp. 60–61, Mar. 1987 (English translation only).

Kopal Electronic Still Camera Components, Yasuo Ishiguro, Shashin Kogyo, pp. 39–44, Jul. 1987 (English translation only).

Canon Still Video Camera RC–760, Imaging System Development Center, Canon Inc., Shashin Kogyo, vol. 46(4), pp. 108–113, Apr. 1988 (English translation only).

Test and Analysis of the Casio Electronic Still Camera VS–101, Sumihisa Hashiguchi, Shashin Kogyo, vol. 46(6), pp. 106–110, Jun. 1988 (English translation only).

Electric Eye: The Future of Electronic Still Cameras—Part 6, Sumihisa Hashiguchi, Sashin Kogyo, vol. 46, pp. 60–61, Aug. 1988 (English translation only).

The Era of Still Video (1) Basic Knowledge of Still Video, Shingo Kido, Shashin Kogyo, vol. 47(1), pp. 37–44, 1989 (English translation only).

Electronic Still Cameras of 1990, Sumihisa Hashiguchi, Shashin Kogyo, p. 96–97, Mar. 1990 (English translation only).

Still Video Camera: Today and Tomorrow, Dr. Kotaro Wakui, Nippon Shashin Gakkaishi, vol. 53, No. 1, pp. 53–58, 1990 (English translation only).

Electronic Still Cameras, Sumihisa Hashiguchi, Journal of the Television Society, vol. 44, No. 11, pp. 1510–1516, 1990 (English translation only).

PhotoMac Edit, Avalon Development Group, 1988, 1989.

PhotoMac Addendum, Avalon Development Group, 1988, 1989, 1990.

PhotoMac, Color Desktop Publishing Software for the Macintosh, Version 1.1, 1989.

Photo Design, Computer Graphics Review, p. 66, Aug. 1989.

Frame Grabbers, Computer Graphics World, at p. 23, Aug. 2, 1989.

MacII data acquisition board/software, Design News, Aug. 7, 1989.

The Imaging Trend: Higher Resolution, Lawrence Curran, Electronic Design, pp. 43–47, Aug. 10, 1989.

Photomac Update Gives Mac Users High–End Color Pre–Press Functions, Bob Ponting, Infoworld, at p. 30, Aug. 14, 1989.

Developers Seek Opportunities in Maturing Publishing Market, Alison Calderbank, Macintosh News, pp. 19 & 24, Aug. 7, 1989.

Icons, Macintosh News, p. 3, Aug. 7, 1989.

Video Analysis, Russell Ito, Macuser, p. 35, Aug. 1989.

Color Capture frame grabber board to support new Quick-Draw, MacWeek, vol. 39, p. 16, Aug. 15, 1989.

Imaging Applications, Magazine Design & Production, Alyce Kaprow, Magazine Design & Production, pp. 32–34, Aug. 1989.

Data Translation, Microcad News, Reader Service #48, Aug. 1989.

Data Translation Image Analyst, Presentation Products Magazine, Reader Service Card #115, Aug. 1989.
ColorKit and ColorCapture, Verbum, Aug. 1989.
Desktop Video Articles, list, Sep. 1989.
Image–editing software, Computer Graphics World, p. 50, Sep. 1989.
Program for Macintosh Analyzes Images, p. 150, Electronic Design, Sep. 14, 1989.
Spotlight on Image Assembly, Desktop publishing software performs color stripping, Graphic Arts Products News, Sep. 1989.
Color Processing Products Pump New Life Into DTP, Patricia Kinley, Macintosh News, Sep. 18, 1989.
Scanning the depths of color, Ken Milburn, MacWeek, vol. 3, No. 33, at p. 78.
Separations, MacWeek, Sep. 26, 1989.
PageMaker gets colorful, MacWeek, vol. 3, No. 34, at p. 62, Sep. 26, 1989.
Letters, Data Translation's Video Frame Grabber, Michael W. Atkins, MacWorld, Sep. 1989.
Mac TV Tools, A sweep of hardware products that can turn a Mac into a low–end video workstation, Lon Poole, MacWorld, pp. 209–216, Sep. 1989.
ColorCapture Grabs Color Images on PS/2, PC Magazine, p. 53, Sep. 12, 1989.
Color Stripping, Computer Graphics World, Oct. 1989.
Frame–Grabber Family Expands With A Software–Compatible PC/AT Model, Lisa Gunn, Electronic Design, Oct. 12, 1989.
Video Board & Color update, EP&P, Oct. 1989.
Data Translation, ESD: THE Electronic System Design Magazine, p. 93, Oct. 1989.
Avalon, Adobe Change Image, Patricia Kinley, Macintosh News, p. 17, Oct. 16, 1989.
Low–cost PhotoMacEDIT without color sep feature, MacWEEK, vol. 3, No. 37, p. 10, Oct. 1989.
Strip Tease, Personal Publishing, Oct. 1989.
Desktop Color is Making News, Alyce Kaprow, Pre–, pp. 16–17, Oct. 1989.
Four–Color Separations On Desktop with PhotoMac Electronic Stripping Software, The S. Klein Newsletter, vol. 11, No. 18, Sep. 22, 1989.
Data Translation, Desktop Video & Picture Publishing Articles and Pick–ups Jan. 1989.
Software plug–in module links digital Darkroom and QuickCapture, Art Products News, p. 24, Jan./Feb. 1989.
Computers & Photography, The art of picture–taking is enduring some profound changes, Rebecca Hansen, Computer Graphics World, pp. 53–60, Jan. 1989.
Avalon Development Corporation . . . , E. P. Digest, Jan. 1989.
Redesigning Reality, Graphic Arts Monthly, pp. 86, 87, 90, Jan. 1989.
24–bit color retouching for II, Norr, MacWEEK, p. 4, Jan. 10, 1989.
Daily prints Mac–separated photo, Steve Hannaford, MacWEEK, p. 8, Jan. 10, 1989.
The parts that make the whole: A Product lineup, Steve Rosenthal, MacWEEK, pp. 14, 16, 20, Jan. 31, 1989.
The song–and–dance Mac, Jamie Krutz, MacWEEK Graphic Arts, pp. 22–25, Jan. 31, 1989.
GA Company Information, for Avalon Development Group and Data Transmission Inc., MacWEEK, pp. 37–39, Jan. 31, 1989.
Large Users of Color Systems Turn to New Breed of Reseller, Abigain Christopher, Macintosh News, p. 33, Jan. 16, 1989.
MacWorld a Haven For New Products, Management Information Systems Week, Jan. 23, 1989.
Color By Numbers, Aileen Abernathy, MacUser, p. 243, Jan. 1989.
Photography in a Computerized World, Susan Roman, Photo District News, p. 26–32, Jan. 1989.
Review Portgolio, Desktop Photo Lab Digital Darkroom, Mikkel Aaland, Publishl, pp. 75–76, Jan. 1989.
Color Desktop Pubilshing, When it does and does not work, Rebecca Hansen, Computer Graphics Worls, pp. 38–42, Feb. 1989.
Photojournalists debate retouching, Connie Guglielmo, MacWEEK, p. 6, Feb. 21, 1989.
Digital photography may replace traditional techniques, Connie Guglielmo, MacWEEK, p. 31, Feb. 28, 1989.
The skill and artistry of image editing, Part two, L. Vespremi, MacWEEK, vol. 3, No. 9, pp. 54–56, Feb. 28, 1989.
ColorKit brings color to QuickCapture board, Connie Guglielmo, MacWEEK, vol. 3, No. 9, p. 14, Feb. 28, 1989.
Color Separation Explained, Steve Roth, MacWorld, pp. 199–205, Feb. 1989.
Reviews, QuickCapture 1.0, Franklin Tessler, MacWorld, vol. 6, No. 2, pp. 236–237, Feb. 1989.
Color Prepress: Generation 2, Ed Schwenn, Printing Views, pp. 25–33, Feb. 1989.
Digital Deliverance, Mikkel Aaland, American Photographer, p. 60, Mar. 1989.
Data Translation unveils ColorKit, Art Product News, p. 17, Mar./Apr. 1989.
PhotoMac Software Edits Color Images on the MacII, The S. Klein Newsletter, vol. 11, No. 5, Mar. 10, 1989.
An electronic alternative to architectural renderings, Lesle Vespremi, MacWEEK, vol. 3, No. 9, p. 35, Mar. 28, 1989.
Color separations: Where we are today, Lesle Vespremi, MacWEEK, pp. 48–51, Mar. 28, 1989.
Selecting a Color Separator, Steve Roth, Macworld, pp. 129–137, Mar. 1989.
More Color for Mac II, Computer Graphics World, Apr. 1989.
Color Photography on the Mac, C. C. Cortez & A. Vasilopoulos, Computer Graphics World, pp. 128–130, Apr. 1989.
Color frame grabber, Electronic Publishing Printing, p. 71, Apr. 1989.
Buyers Guide, LABC Communication World, Apr. 1989.
Mac enters video picture, Michael Murie, MacWEEK, vol. 3, No. 17, pp. 70–73, Apr. 25, 1989.
Apple sets the standard with 32–bit color QuickDraw, Steve Hannaford, MacWEEK, pp. 56–58, Apr. 25, 1989.
Photo retouching on the Mac II, PRE–, pp. 31–32, Apr. 1989.
Infrared Thermography, The versatile preventive maintenance tool that lets you see what you've been missing., Maintenance Technology, Nov. 1989.
List of Manuals.
FUJIX DS–100 Memory Card Camera, IM–8S Image Memory Card and DP–100 Memory Card Processor Brochure, Fuji Photo Film Co., Ltd.

FUJIX DS–100 Memory Card Camera, IM–8S Image Memory Card and KP–10 Memory Card Processor Brochure, Eyes for your Mac, Fuji Photo Film Co., Ltd.

FUJIX DS–100 Memory Card Camera, IM–8S Image Memory Card and DP Processor Brochure, Eyes for your PC, Fuji Photo Film Co., Ltd.

FUJIX DS–1P The world's first digital still camera, Prototype, Fuji Photo Film Co., Ltd.

Japanese language and English translation of Fuji Internal Document re Product planning meeting report, HC–1 Product planning (Product name: HC–1000), Jul. 11, 1991.

Quick Start Guide, Obsidian PC Utilities, Obsidian Imaging, Inc., 1996.

MegaVision Studio System—Summary, 1989.

MegaVision customer applications, 1989.

MegaVision, Graphic Arts Customer Applications.

Vision 2000, Sonomed, Inc., 1988–1989.

MegaVision 2000.

Advanced Imaging envelope.

For Immediate Release, MegaVision is pleased to announce its publication processing system, Sonomed, Inc. 1988.

For Immediate Release, MegaVision is pleased to announce its publication processing system.

Model MegaVision 1024, Preliminary, Functional Summary, Sonomed, Inc., Sep. 21, 1987.

Tessera, Marketing Materials re Tessera camera.

Tessera FPS 2000, Software Functions.

The Eelctronic Studio, PMSI: The Filmless Photo Studio, Sylvia Paine, Photo District News, pp. 71–72, May 1990.

Computer Publishing Systems Shake Up Graphics Trades, Sam J. Merrell, Photo District News, at p. 36, Dec. 1989.

Combination/Starter Station Block Diagram.

Innovation: Creating The Difference, Step 1. Utilizing The Difference . . . , PMSI Tessera Photo Mechanical Services, Inc.

MegaVision's Press Release of an interface to Videk's 2K X 2K CCD camera, Mar. 1990.

MegaVision, Interface To The Videk 2048 X 2048 CCD Camera.

Proposed Mega Plus Camera Configuration, Mar. 28, 1989.

Automated Edge Measurement, Videk pp. 1–6.

MegaVision Purchase Orders, Aug. 22, 1989.

MegaVision Invoice No. 00433, Jul. 20, 1990.

Letter to Ken Boydston from Wes Perdue Dec. 5, 1990.

Customer Support File, Oct. 1986.

MegaVision shipping slips, Oct. 2, 1990.

MegaVision Debit/Shipping Memo, Aug. 28, 1989.

Videk Division Formed by Kodak (with notes), Jan. 21, 1985.

Kodak press release, Ultra–High Resolution Image Sensor Fabricated by Kodak Research Team and KAF–4200 Multi–Megapixel Full Frame Imager, Dec. 7, 1988.

Kodak Develps Sensor That Will Make Much Clearer Electronic Camera Images, Clair Ansberry, The Wall Street Journal, Dec. 6, 1988.

Handwritten Notes.

MegaVision Purchase Order No. 73073, Oct. 15, 1986.

Videk, Megaplus Camera Notes.

MegaVision Invoices, Oct. 23, 1987.

MegaVision Purchase Order No. 75928, Aug. 8, 1988.

MegaVision letter to Videk, Apr. 5, 1989.

MegaVision letter to Videk, Aug. 15, 1989.

MegaVision letter to Videk, Aug. 16, 1989.

MegaVision Purchase Order No. 578412, Aug. 22, 1989.

MegaVision Quotation for Videk.

MegaVision Purchase Order No. 520767, Sep. 21, 1990.

MegaVision letter to Videk, Oct. 18, 1990.

MegaVision letter to Videk, Oct. 30, 1990.

MegaVision letter to Videk, Dec. 4, 1990.

Videk letter to MegaVision, Dec. 5, 1990.

MegaVision Invoice No. 00447, Dec. 21, 1990.

Videk letter to MegaVision, Oct. 20, 1988.

Thermo Tracer TS7302, photographs.

Thermal Imaging Cameras, Systems & Software, Mikron Infrared, Inc.

Product Data Sheet, MikroScan 7200V, Mikron's Proven MikroScan 7200 Series Thermal Imager Includes New Built–In Visible–Light Camera, Mikron Infrared, Inc.

Product Data Sheet, MikroScan 7302, Fixed–Installation Infrared Thermal Imager, Mikron Infrared, Inc.

Product Data Sheet, MikroScan 7400, Mikron Infrared, Inc.

Product Data Sheet, MikroScan 7515, Mikron's Low–Cost, Radiometric IR Camera with MikroSpec Thermal Imaging Software and Certificate for Full Recalibration, Mikron Infrared, Inc.

Product Data Sheet, MiKroScan 7200, Mikron Instrument Company, Inc.

Product Data Sheet, MiKroScan 5104, Mikron Instrument Company, Inc.

TH5104 IR Man, Thermal Imaging System for Research and Industrial Process Monitoring at an Affordable Price, Mikron Instrument Company, Inc.

Non–Contact Temperature Measurement, Thermal Imaging, & Calibration Standards, Mikron Infrared, Inc.

Using MikroSpec R/T Software with the MikroScan 5104i, Mikron Infrared Company, Inc., 2003.

Using MicroSpec R/T Software with the MikroScan 7302, Mikron Infrared Company, Inc., 2003.

TH5104 IR Man Thermal Imager Operator's Manual, Mikron Instrument Co., Inc., May 5, 1998.

MikroScan 7515 Thermal Imager, Operator's Manual, Mikron Infrared, Inc.

MikroScan 7200 Thermal Imager, Operator's Manual, Mikron Infrared, Inc.

MikroScan 7200V Thermal Imager, Operator's Manual, Mikron Infrared, Inc.

MikroScan 7400 Thermal Imager, Operator's Manual, Mikron Infrared, Inc.

On Holy Wars and a Plea for Peace, Danny Cohen, IEEE Computer, pp. 48–54, Oct. 1981.

Integraph Raster File Format at http://www.oreilly.com/www/centers/gff/formats/ingr/.

Color Image Quantization for Frame Buffer Display, Paul Heckbert, Computer Graphics, pp. 297–307, Jul. 1982.

Design rule for Camera File system Version 1.0, Japan Electronic Industry Development Association Standard, Dec. 1998.

Dycam Camera Interface Specification, Dycam, Inc., Jan. 12, 1991.

Recursive Block Coding—A New Approach to Transform Coding, Paul M. Farrell and Anil K. Jain, IEEE Transactions of Communications, vol. Com–34, No. 2, Feb. 1986.

Spreadsheet Listing of Graphic File Formats from Solutions International, Mar. 1989.

Toshiba MC200 brochure, 1990.

A High Resolution CCD Camera for Scientific and Industrial Imaging Applications, G. J. Martin, K. H. Womack and J. H. Fischer, SPIE vol. 818 Current Developments in Optical Engineering II, pp. 301–319, Feb. 16, 1987.

High–Density Solid–State Image Sensor, W. C. Chang, T. J. Tredwell, E. G. Stevens and D. N. Nichols, SMPTE Journal, pp. 1186–1188, Dec. 1987.

Kodak Videk Exhibition Information, Electronic Imaging, at p. 51, 1989.

Kodak Videk Exhibition Information, Electronic Imaging, at p. 45, 1989.

Dycam Product Description and Block Diagrams of Dycam Concept, Feb. 15, 1988.

Letter from William R. Parker, Bio Image, to W. C. Chang, May 19, 1988.

Encyclopedia of Graphics File Formats, James D. Murray and William vanRyper, O'Reilly & Associates, Inc., 1994.

MacIntosh Presentation Programs.

Personal Computer Camera, PCC alliances will simplify document maniuplation and solve data transfer challenges, Mar. 7, 1994.

Your next SLR may be digital, Gary Pageau, Photo Marketing, pp. 48–49, Mar. 1994.

Still–video technology finding its niche, Mikkel Aaland, MACWEEK, at p. 44, Nov. 29, 1990.

Filmless Photography: No Muss, No Fuss, James Karney, Business Publishing, Apr. 1992.

Still Video Captures the Scene, Michael Murie, Publish, at p. 89, Aug. 1991.

All–CMOS imaging challenges CCDs, Chappell Brown, techweb.com, Issue: 882, Jan. 2, 1996.

CMOS imager clicks for digital camera, Junko Yoshida, techweb.com, Issue: 938, Jan. 27, 1997.

CMOS goes where CCD has treaded, techweb.com, Issue: 899, Apr. 29, 1996.

CMOS Active Pixel Sensor Technology, photobit.com.

New Imaging Sensor Shrinks Cameras to the Size of a Chip, Jet Propulsion Laboratory, California Institute of Technology, NASA, Jun. 20, 1995.

Instantly capture digital photos . . . . , Dycam Inc., 1991.

Still–video technology: products for creating a desktop photo studio, Brad Thompson, Computer Shopper, Dec. 1992.

Focusing on the future, David Berkowitz, Tri–Daily Herald, Jun. 14, 1993.

Digital camera eliminates film, Livermore firm's SV–2001 captures images on disc, Lesley Guth.

AFCEA West Intelligence Symposium: System Support to the Operational User, Communication and Sensor Processing Systems, Image Architecture for Tactical Operations, Mar. 1990.

Data Formats and Their File Extensions (History of Uniform Image File Formats).

Dycam Model 10–C (Editor's Choice award 1996), Daniel Grotta and Sally Weiner Grotta, PC Magazine, Jun. 16, 1997.

Digital Still Camera Image File Format Standard (Exchangeable image file format for Digital Still Cameras: Exif) Version 2.1, Japan Electronic Industry Development Association, Jun. 12, 1998.

Canon Software Starter Guide (For the Canon Digital Camera Solution Disk Version 12), Canon Inc., 2003.

PICT—Macintosh Graphics Files, Sep. 28, 2000.

SideKick for PM: More Than Just Pretty Face, Stan Miastkowski, BYTE, at p. 97, Apr. 1989.

ELECTRonic IMaging, excerpts from electrim.com, Electrim Corporation website.

Dycam Digital Camera Stores Gray–Scale Images, Roxanna Li Nakamura, InfoWorld, Jun. 11, 1990.

Dycam's Digital Camera Downloads Photos to PCs, Macs, Paul Worthington, Infoworld, at p. 19, Oct. 1, 1990.

Computer Connection, Darrell Kreckel, The Daily Reporter, Oct. 12, 1990.

Instant Camera Can Record Image and Display it on Mac Screen—Dycam to Release Digital still Camera, Gregory Quick, Macintosh News, Feb. 12, 1990.

Miscellaneous articles re Dycam.

Article on Kodak's DCS 100 Camera, Popular Photography, 1989.

New on the Market, GRiD Throws Hat into Desktop Ring with 386 MCA, 12–MHz AT, Lori Grunin, PC Magazine, vol. 8, No. 9, at p. 51, May 16, 1989.

Video Interface Circuit, IBM Technical Disclosure Bulletin, vol. 29, No. 1, Jun. 1986.

Deneba Softward Ships Ultrapaint, Canvas 2.1, Eric Lach, InfoWorld, vol. 11, Issue 51, p. 39, Deb. 18, 1989.

Photoshop and Color Studio: Mac Image Manipulation Tools, Michael J. Miller, InfoWorld, vol. 12, Issue 5, p. 118, Jan. 29, 1990.

A Data Formatter, Warren L. Bean and Tripelo M. Copper, Navy Technical Disclosure Bulletin, vol. 9, No. 2, Dec. 1983.

Getting the Picture, Edward Henning, PC User, No. 120, pp. 93–94, Nov. 22, 1989.

Digital Camera Market Worldwide, InfoTrends Research Group, Inc. presentation, undated.

Digital Camera End User Trends 1999 End User Survey Results, InfoTrends Research Group, Inc. presentation, Nov., 1999.

Japanese Slide Presentation, InfoTrends Research Group, Inc., 2001.

Digital Electronic Still Camera System, ITEJ Technical Report, vol. 13, No. 22, pp. 17–22 (Mar. 1989) Sasaki, et al. (English translation attached).

Canon, Still Video Camera RC–250 Xapshot manual, Canon Inc., (1988).

Digital still camera and DAT, Electronic Eye, Hashiguchi (Aug. 1989) (English translation attached).

Graphics Formats: A close look at GIF, TIFF, and other attempts at a universal image format, Byte, at 305 (Sep. 1989), Gerald L. Graef.

What's New in Bitmap Formats: A look at Windows and OS/2, PC Magazine, vol. 9 No. 15, pp. 403–405, 409, 410 (Sep. 11, 1990).

How Sony Beat Digital–Camera Rivals, The Wall Street Journal, vol. CCXXXIII No. 16 (Jan. 25, 1999), Alec Klein.

Macintosh Guide Book, Mainichi Communications (Nov. 30, 1988), Kazutoshi Otani (English translation attached).

The Still Video Picture, Computer Graphics World, vol. 13, No. 2, at p. 69 (Feb. 1990), Phillip Robinson.

Sales of the World's First "Digital Still Camera System", Fuji Photo Film Corporation (Oct. 16, 1989) (English translation attached).

FUJIX DS–X Memory Card Camera User's Manual (undated) (English translation attached).

Digital Still Camera—The First for Commercial Use, Denpa Shinbun (Oct. 17, 1989) (English translation attached).

Digital Still Camera on Sale, Kagaku Kogyo Nippon (Oct. 17, 1989) (English translation attached).

Digital Still Camera System Joint Announcement Q&A (undated) (English translation attached).

IC Camera in Test Production, Nihon Keizai Shinbun (Mar. 24, 1989) (English translation attached).

Corporate–External Announcement Permission Request Form, Fuji Photo Film Company, Limited, Mikio Watanabe (Feb. 6, 1990) (English translation attached).

III Digital Recording Technology, Fuji Photo Film, Ltd., Mikio Watanabe (undated) (English translation attached).

FUJIX Memory Card Camera DS–X, Fuji Photo Film Co., Ltd. (undated).

Beyond Photography—The Digital Darkroom—Image Processing, AT&T Bell Laboratories (1988), Gerald J. Holzmann.

Build the Micro D–Cam Solid State Video Camera, Part 1: The IS32 Optic RAM and the Micro D–Cam Hardware; Ciarcia's Cellar, Byte, vol. 8, No. 9, pp. 21–31 (Sep. 1983), S. A. Ciarcia.

Build the Micro D–Cam Solid–State Video Camera, part 2: Computer Interfaces and Control Software, Byte, pp. 31–55 (Oct. 1, 1983).

The Microneye, Hardware Review, Byte, pp. 316–320 (Oct. 1983), Chris Wieland.

Dycam Model 1 the 'first portable digital still camera', MacWeek, vol. 4, No. 35, p. 34 (Oct. 16, 1990), Carolyn Said.

CCDs in Astronomy II, New Methods and Applications of CCD Technology, L. Davis Press (Mar. 15–17, 1990), A.G. Davis Philip, Donald S. Hayes, Saul J. Adelman.

Stil–video news flash: Kodak back for Nikron F3, Popular Photography, p. 56 (Jan. 1991).

History of the digital camera, pp. 1–8, http://www.digicam-history.com/1990.html.

International Standard ISO 4341, Information processing—Magnetic tape cassette and cartridge labelling and file structure for information interchange (Dec. 1, 1978).

Los Alamos National Laboratory Technical Report, A Manual For Microcomputer Image Analysis, (Oct. 22, 1989), Paul M. Rich, et al.

Memo regarding TIFF, Aldus/Microsoft, pp. 1–49 (Aug. 8, 1988).

NOST: Definition of the Flexible Image Transport System (FITS), NASA/Science Office of Standards and Technology (Mar. 29, 1999).

An Experimental Digital Videotape Recorder, SMPTE Journal, vol. 89 at p. 173 (Mar. 1980).

Digital Video Recording—Some Experiments and Future Considerations, SMPTE Journal, vol. 89 at p. 658 (Sep. 1980), Masahiko Morozumi, et al.

Technical Note DV17, Sony Driver: What Your Sony Drives for You, Sony (May 1, 1990).

Digital Still Camera System, ITEJ Technical Report, vol. 14, No. 5, pp. 13–18 (Jan. 18, 1990) (English translation attached).

Understanding Electronic Photography, TAB Professional and Reference Books, (1990), John J. Larish.

Digital Card Camera, ITEJ Technical Report, vol. 14, No. 5, pp. 7–12 (Jan. 18, 1990), Hiroyoshi Fujimori, et al. (English translation attached).

Card Camera "FUJIX DS–1P", ITEJ Technical Report, vol. 13, No. 22, pp. 11–16 (Mar. 31, 1989) (English translation attached).

Picture Coding for Digital Still Camera, Toshiba Review, vol. 45, No. 8 (1990), Minoru Sasaki (English translation attached).

Present Situation and Future of Electronic Still Camera, S20. The Current State and Trends in TV Cameras, The Current State and Trends in Electronic Still Cameras, Joint Convention Record of Institute of Electrical and Information Engineers, Japan, vol. 1990, No. Pt 3, pp. 3.137–3.140, (Aug. 28–30, 1990), Minoru Sasaki (English translation attached).

What Type of Electronic Still Camera is Best Suited for Business Use?, Electronics Life, Article Serial No. 0002 (Apr. 1990) (English translation attached).

MacLink Plus advertisement, MacWeek, vol. 4, No. 11 (Apr. 1990).

The Fujix still video camera is now at prototype stage, The Fujix camera is on the cards, The British Journal of Photography (Dec. 8, 1988), Peter A. West.

Magnetic Tape Cassette Labeling and File Structure for Information Interchange, Japanese Standard Association (Mar. 1, 1982) (English translation attached).

A High Res Color Camera Drives Hands–on Prepress, Advanced Imaging at p. 62 (May 1990), Ken Boydston.

The Complete Solution For All Your Image Scanning Needs . . . Array Scanner–One, Array Technologies and associated documentation (1990).

Sony MVC–A7AF ProMavica Professional Still Video System, Sony Corporation (1987).

The home computer that's ready to work, play and grow with you, Apple Computer Inc. (Dec. 1977).

Short Takes, Byte (Jul. 1989).

PMSI: The Filmless Photo Studio, Photo District News at p. 71 (undated), Sylvia Paine.

Publish Pac, Dest Corporation, pp. 21, 9, 50 (1986).

Dycam Windows Software (Version 1.0), User's Manual for Dycam Model 1 Digital Still Camera, Dycam Inc. (1991).

Kodak Digital Camera System: A New Tool For Photojournalists, Kodak, pp. 1–4 (May 31, 1991), Joseph Runde.

Kodak Professional DCS Digital Camera System DM3 and DC3, Eastman Kodak Company (1991).

Kodak Professional DCS Digital Camera System, Eastman Kodak Company (1992).

Getting it on Tape, MacUser (Dec. 1989), John Rizzo.

Scanning the Color Horizon, MacUser (Jun. 1989), Henry Bortman.

Quick Clicks, Magic Digitizer, MacUser (May 1987), Henry Bortman.

Gray Expectations, MacUser (Jun. 1989), Aileen Abernathy and Peter Weiss.

Canon ad, MacUser (Dec. 1989).

RasterOps Video ColorBoard 364, MacUser (Oct. 1990), Russell Ito.

New Image to show new scanners, MacWeek (Aug. 2, 1988), Connie Guglielmo.

Toshiba Digital SV Camera, Photomethods, (date illegible), Richard Conway.

Electronic Still Imaging, Photomethods at p. 26 (Apr. 1989), Alfred DeBat.

The Quest for the Electronic Camera, PRE (undated), Ken Boydston.

The Tessera Electronic View Camera System, Professional Filmless Photography (undated).

Digital Cameras Monitor, The Future Image Report, vol. 3, Issue 2 (1995).

Seybold Conference '91, PDN (Jan. 1991), Alexis J. Gerard.
Canon Navigator, The navigator and associated documentation, Canon U.S.A., Inc. (Jan. 1989).
EDC–1000/EDC–1000TE Computer Camera, Technical Manual and associataed documentation, Electrim Corporation (mid–1989).
EDC–1000 Electronic Imager, Electrim Corporation, News Release and associated documentation (1989).
EDC–1000 Computer Camera Technical Manual, Electrim Corporation (1989).
Introducing CD–ROM Desktop Publishing from NEC, MacUser (Nov. 1989).
Capture Priceless Images, Inexpensively, MacUser (Apr. 1990).
Video Camera Interface, MacUser (Sep. 1990).
Bobker's Dozen, MacUser (May 1990), Steven Bobker.
Erasable Optical Drives, MacUser (Nov. 1990), John Rizzo.
The SB–90 Minolta Still–Video Back, Photomethods (Apr. 1988), Lief Ericksenn.
Corel Optical Disks for Novell Lans, PC World (May 1989).
New Products Preview, Laser Focus World (Jun. 1990).
Mitsubishi Optical Storage Subsystem, PC World (Mar. 1990).
Super Storage, PC World (Jun. 1990), Robert Luhn.
Low Cost Digital Camera For PCs, Computer Shopper (Jan. 1989).
Optoelectronics and Image Sensor Data Book, Texas Instruments (1987).
MegaVision documentation, MegaVision, Inc.
Advanced Imaging (Mar.–Apr. 1988).
Canvas 2.0 Draw–Paint Combo an Excellent Graphics Package, MacWeek (Jan. 24, 1989), Robin Webster (http://global.factiva.com/en/arch/display.asp).
Canvas Stretches, MacUser (Apr. 1, 1989), Phillip Robinson (http://global.factiva.com/en/arch/display.asp).
Japanese Patent Office communication, "INTERROGATION", Dispatch No. 052203, Jun. 8, 2004, 2 pages (English translation attached).
Jan. 9, 2004 Letter from Vito J. DeBari to Carrie M. Lambert, Esq.
Jan. 9, 2004 Letter from David H. Ben–Meir to Carrie Lambert, Esq.
Memorandum Opinion, Sep. 3, 2002, *St. Clair Intellectual Property Consultants, Inc.* v. *Sony Corporation et al.,* Civil Action No. 01–557 (JJF), United States District Court, District of Delaware.
Special Verdict Form, Feb. 25, 2003, *St. Clair Intellectual Property Consultants, Inc.* v. *Sony Corporation et al.,* Civil Action No. 01–557 (JJF), United States District Court, District of Delaware.
Memorandum Opinion and Claim Construction Order, Aug. 31, 2004, *St. Clair Intellectual Property Consultants, Inc.* v. *Sony Corporation et al.,* Civil Action No. 01–557 (JJF), United States District Court, District of Delaware.
Submission of Court Papers From Litigation Involving Patent In Reexamination, Sep. 10, 2004.
Program Notes, Electronic Still Photography ESP '90, Rochester Institute of Technology, Oct. 23, 30, 1990.
"Agema's Thermovision 470 System Identifies Faults", Electricity International, Jun. 1989.
"Thermographics", Energy Today, Jul/Aug. 1989.
Avalon Development Group, PhotoMac Addendum Chapters 1–4, 1989.

English Translation of International Publication No. WO 90–09717 by Ralph McElroy Translation Company, Austin, Texas.
Data Translation, Inc., Data Translation Annual Report 1989.
Sasaki et al, "Digital Electronic Still Camera System," ITEJ Technical Report, vol. 13, No. 22, pp. 17–22, Mar. 1989 (and translation).
Avalon Development Group, PhotoMac Box Cover.
Avalon Development Group, PhotoMac Software Warranty and License Agreement and Product Registration Form, undated.
Photocopy of PhotoMac Program Disk (1988).
Photocopy of PhotoMac image one disk (1988).
Photocopy of PhotoMac image two disk (1988).
Photocopy of PhotoMac image three disk (1988).
Avalon Development Group, PhotoMac, 1988, 1989.
Avalon Development Corp. News Release, "Color Process Package Coming In Fall", Jul. 12, 1988.
Desktop Reviews, MacUser, Jul. 1989, pp. 181–182.
Reviews, PhotoMac 1.0, MacWorld, May 1989.
Said, Carolyn, Dycam Premiers Still–Video Camera, MacWEEK, Mar. 1990, vol. 4 No. 11, p. 27.
Said, Carolyn, Dycam Model 1 the "first portable digital still camera", MacWEEK, vol. 4 No. 35, Oct. 16, 1990.
Agema Consolidated Monthly Report Dec. 1989.
Agema Infrared Systems, Thermovision 400 Series—United Kingdom Price List—Valid from Jul. 1989.
Facsimile message from Maria Capela of Agema Infrared Systems to John Ahlstrom dated Sep. 13, 1989 with Marketing Plans attached.
"Still Video—Still Here?", Electronics World & Wireless World, at 873 (Oct. 1990), George Cole.
"Should I Sell Now? Follow the Trends", CompuServe Magazine, at 30 (Nov. 1991), Robert Cullen.
"Apple Planning to Announce 68030 Version of MacII", Info World, vol. 10, No. 38 (Sep. 5, 1988), Laurie Flynn, et al.
"Digital Card Camera", ITEJ Technical Report, vol. 14, No. 5, at 7 (Jan. 1990), Fujimori et al.
"Graphics Formats", Byte, at 305 (Sep. 1989), Gerald L. Graef.
"Directory Assistance", Byte, at 327 (Jun. 1989), Rick Grehan.
"Picture Recording and Electric Power Consumption", Shashim Kogyo, at 94 (Apr. 1988), Sumihisa Hashiguchi.
"Possibilities of the Digital Electronic Still Camera", Shashin Kogaku, at 110 (Feb. 1988), Sumihisa Hashiguchi.
"MacDOSsier, Tearing Down The Walls Between Macs And PCs", MacWorld, at 165 (Jul. 1990), Jim Heid.
"Swallowing Planets; Today's Feeding Frenzy of Data Capture", Journal of Electronic Defense, vol. 12, No. 10, at 109 (Oct. 1989), Sheldon B. Herskovitz.
"Desktop Video On The Amiga", Electronic Learning, vol. 8, No. 2, at 54 (Oct. 1988), Lanny Hertzberg.
NASA Tech Briefs, Digital Electronic Still Camera, at 39 (Mar. 30, 1993), Samuel D. Holland, et al.
"Imaging A Vampire; Sofware Review"Evaluation Of Three MSDOS–Based Image Processing Software Packages, ESD; The Electronic System Design Magazine, vol. 19, No. 10, at 63 (Oct. 1989), Steven J. Hollinger.
"Digital Still Video Camera Using Semiconductor Memory Card", IEEE 1989, at 184 (1989), Izawa, et al.

"Marketing through Innovation, Photonics at Work", Photonics Spectra, vol. 23, No. 7, at 66 (Jul. 1989), Herbert Kaplan.

Photoshop and Color Sudio: Mac Image Manipulation Tools, Info World, at 118 (Jan. 29, 1990), Michael Miller.

"Logitech Debuts Digital Camera", Government Computer News, vol. 10, No. 19 (Sep. 16, 1991), Cynthia Morgan.

"Electronic Imaging Camera Stores Images on Chips", Laser Focus World, at 72, 74 & 75 (Apr. 1990), Paul Mortensen.

"TIFF File Format", The C Gazette, vol. 5, No. 2, at 27 (Winter 1990–1991), James Murray.

"Solid–State Electronic Still Camera Memory Card System", ITEJ 1989, at 193–194, Nakagawa, et al.

"Digital Still Camera System", ITEJ Technical Report, vol. 14, No. 5, at 13 (Jan. 1990), Nishi, et al.

"Card Camera 'FUJIX DS–IP'", ITEJ Technical Report, vol. 13, No. 22,.at 11 (Mar. 1989), Ochi, et al.

"State Of The Art For The 90's Office", Appliance Manufacturer, vol. 37, No. 1, at 76 (Jan. 1989), Norman Remich.

"Highlights From Digital 90 Trade Show", Editor & Publisher, vol. 123, No. 7, at 42P (Feb. 24, 1990), Jim Rosenberg.

"Dycam Model I the 'first portable digital still camera'", MacWEEK, vol. 4, No. 35, at 34 (Oct. 16, 1990), Carolyn Said.

"Dycam premiers still–video camera", MacWEEK, vol. 4, No. 11, at 27 (Mar. 20, 1990), Carolyn Said.

"Camera Uses E2 PROM Film", Electronic Engineering Times, at 45 (Apr. 10, 1989), Miyoko Sakurai.

"Picture Coding For Digital Still Camera", Toshiba Review, vol. 45, No. 8, at 635 and 638 (1990), Sasaki.

"Now And Future Of Electronic Still Camera", 1990 Joint Convention Record of Institutes of Electrical and Information Engineers, Japan (Aug. 28–30, 1990) Sasaki et al.

"Graphics Power For The Rest Of Us", PC World, at 164 (Nov. 1990), Mike Smith–Heimer, et al.

"Digital Still Camera For Business Use", Electronics Life, at 84 (Apr. 1990), Someya.

"Photoshop is Picture–Perfect", Byte, at 103 (Apr. 1990), Tom Thompson.

"Freelance Masters OS/2", PC World, at 85 (Nov. 1990), John Walkenbach.

"Overview Of The Jpeg (ISO/CCITT) Still Image Compression Standard", SPIE, vol. 1244 Image Processing Algorithms and Techniques, at 220 (1990), Gregory Wallace.

"A Bit Rate Controlled Dci Compression Algorithm For Digital Still Camera", Proc. of SPIE—The International Society for Optical Engineering, vol. 1244 at 234 (Feb. 12–14, 1990), Watanabe, et al.

"Photos Go Electronic: New Standard Pulls Images Into Computer Age", High Technology Business, vol. 8, No. 2; at 15 (Feb. 1988), Robert Wood.

"AGA Thermovision Digital Image Processing System", by AGA Infrared Systems AB (1982).

"AGA Thermovision OSCAR—Pericolor System—Product Information", by AGA Infrared Systems AB (Copyright 1980).

"Agema Product Specification—TIC–8000 with CATS, A Complete Hardware/Software Package For Thermal Analysis", by Agema Infrared Systems (1986).

Apple SuperDrive: User Guide, http://docs.info.apple.com/article.html?artnum–4545 http://docs.info.apple.com/article.html?artnum–4546 http://docs.info.apple.com/article.html?artnum–4547 (Aug. 2, 1989), Apple Computer, Inc.

Canon XapShot RC250 Manual (1988).

Canvas 2.0 software.

Canvas 2.0 Upgrade Manual, at v. (1988), Levy et al, Deneba Systems, Inc.

CompuServe Financial Services User's Guide, at 4–10 (Jul. 1988), CompuServe Incorporated.

CompuServe Information Manager User Guide, at 115, 121, 172, 182, 183 (Nov. 1989), CompuServe Incorporated.

CompuServe Information Service, VIDTEX 4.0 Standards for Terminal Emulator Programs (Apr. 1985), CompuServe Incorporated.

"Curtis Inc. Announces New Prices And New ROMDISK Models", New Release (Jan. 4, 1988), Curtis, Inc.

Dataviz "MacLink Plus" Advertisement, MacWorld, vol. 7, No. 4 (Apr. 1990).

"Digital Back For Medium–Format Rollei Cameras", Editor & Publisher, vol. 124, No. 8, at 23P (Feb. 23, 1991).

"Digital Camera—The Path To The Present", by Japan Camera Museum (Oct. 24, 2000).

DRAW, a Hi–Res Drawing Program by Micro–Labs, Inc. (1984).

"Fujifilm Brings The Digital Camera Ds–7 With Convenient SmartMedia Storage To The Consumer Market", http://www.fujifilm.co.jp/eng/salon/pkna/digi–1.html (Sep. 18, 1996).

Fujix Digital Still Video Camera DS–IP, Fuji Photo Film Co., Ltd (1988).

FUJIX DS–X user's manual (1991).

Graphics Interchange Format (GIF) Specification, pp. 1–18, CompuServe (Jun. 15, 1987).

Graphics Interchange Format, Version 89a, pp. 1–42, CompuServe (Jul. 31, 1990).

Heat Made Visible—The World of Infrared, by Agema Infrared Systems (1989).

HMI Protocol Definition Document, Remote Terminal Interrogation Sequence 1.10.2, at 1.

IBM Disk Operating System Version 3.3 User's Guide and Reference, First Edition (Apr. 1987).

"IC Card Camera System—Toshiba & Fuji Photo Film", Dempa Daily Newspaper Technical Report (Mar. 30, 1989).

Inside Macintosh vol. V by Apple Computer, at V–85 to V–115 (Jan. 1988).

Macintosh IIx Owner's Guide (1988).

Macintosh MacPaint Manual, Apple Comuter, Inc. (1983).

Macintosh Manual (1984).

Macintosh SE with FDHD (SuperDrive).

Macintosh System Software User's Guide Version 6.0 (1988).

"Maintenance Technology—Infrared Thermography" Agema Infrared Systems (Nov. 1989).

Microsoft MS–DOS User's Guide Version 3.3, Microsoft Corporation (1987).

MS–DOS 4.0.

"Palmtop Computer Sales Soar", The Atari Report, vol. 3, No. 1, at 5 (of printout), Atari Corporation (Spring 1990).

Personal Vision, Live/Video/Frame Grabber for Macintosh II (1989).

PhotoMac, User Manual, at 105–106, Avalon Development Group, (1988), Ewart et al.

Prototype Announcement, Fujix DS–IP digital still camera, Fuji Photo Film Co., Ltd., Fuji News (Sep. 20, 1988).

"Reviews: Adome Photoshop 1.0", MacWorld, vol. 7, No. 6, at 186 (Jun. 1990).

SLIDESHOW, a RAPIDOS Software by Rapidynamic Software, Inc., licensed to Micro–Labs (1984).

"Still Videos, Anyone?", IEEE Spectrum, at 41 (Feb. 1990).

Stuffit, Macuser, at 77 (Dec. 1988).

"The Atari Portfolio Palmtop", http://www.atari–history.com/computers/pccomputers/portfolio.html (1989).

"Thermovision 470 Information—Thermovision 470 System", by Agema Infrared Systems (1989).

Thermovision 800 Series Burst Recording Unit—Burst Recording Unit, by Agema Infrared Systems (1988).

TIC–8000 With CATS E—Thermovision 800 Series TIC–8000 With CATS E The Complete Hardware/Software Package For Thermal Analysis, by Agema Infrared Systems (1988).

Apple II System Utilities Manual, Apple Computer, Inc. 1985.

Apple IIGS System Software User's Guide, Version 5.0, Chapter 2 and Chapter 6.

BountyQuest Digital camera with PC–compatible output format Bounty, http://www.bountyquest.com/bounties/displayBounty.php?bounty Name=1121, Bounty Quest Corp., Inc. (2000–02).

Thermovision 470 Technical Specification, Thermovision 400 Series Operating Manual, AGEMA Infrared Systems AB (1989).

Color process package coming in fall; PhotoMac, computer software from Avalon Development Corp; product announcement, Andrew C. Wilson, Ziff Davis Publishing, MacWeek; vol. 2, No. 28, p.1 (Jul. 12, 1988).

Your Computer Can See; Introducing the World's First Portable Digital Still Camera; Dycam Inc. (1990) (4 pages).

Dycam DOS Software User's Guide, Dycam Inc. (1988).

Dycam Sales Manual, Dycam Inc. (Jun. 1, 1991).

The Digital Camera Company, Dycam Inc. (4 pages undated).

Adobe to Bring Color Pre–Press to Desktop; Info World, vol. 11, Issue 40, at 42 (Oct. 2, 1989).

Canvas 2.0 challenges MacDraw; Software Review; evaluation; Robin Webster; Ziff Davis Publishing, MacWeek; vol. 2, No. 32, p. 10 (Aug. 9, 1988).

Canvas 2.0; Macworld; vol. 6, No. 4 at 176, 178 (Apr. 1989) (7 pages).

Reviews, Photo Ops, PhotoMac 1.0; Steve Roth; Macworld at 176 (May 1989) (4 pages).

Short Takes, Industrial–Strength Color Processing; Tom Thomp;McGraw Hill; Byte at 97 (Apr. 1989) (4 pages).

Deneba Software Ships Ultrapaint, Canvas 2.1; Eric Lach, InfoWorld; vol. 11, Issue 51 at 39 (Dec. 18, 1989) (3 pages).

Draw Pardner; Steve McKinstry; Macworld at 140 (Aug. 1989) (14 pages).

Digital Camera as Computer Peripheral; Wendy Woods/ 19900103; CompuServe Information Service (News) (Trends)(SFO)(00008) (1 page undated)).

Toshiba flashes digital camera; Electronic Engineering Times; Issue 562 (Oct. 30, 1989) (2 pages).

Electronics, Direct–To–Disc Recording; Stephen A. Booth; Popular Mechanics; vol. 166, No. 3 at 32 (Mar. 1989) (4 pages).

Methods in calibration and error analysis for imaging radiometers; James M. Palmer; Optical Radiation Measurements II; SPIE—The International Society for Optical Engineering; vol. 1109, pp. 30–38 (Mar. 27–28, 1989).

Trials identify faulty insuation; Insulation Journal; vol. 33, No. 2 at 17; (Apr. 1989) (2 pages).

CEGB installs IR system; Processing; Techpress; at 13 (Jul. 1989) (3 pages).

Thermal inspection system; Sensor Review; vol. 9, No. 3 at 171 (Jul. 1989) (3 pages).

Digital Recording Unit, Agema Infrared Systems, Secaucus, NJ; American Society for Nondestructive Testing, Inc.; Materials Evaluation; at 753 (Jul. 1989) (3 pages).

IR Thermography Speeds Engine Mold Development; Control Engineering; vol. 36, No. 6 (Jun. 1989) (3 pages).

Improving Maintenance With Infrared; Maintenance Technology an Applied Technology Publication; vol. 2, No. 11, pp. 46–55 (Nov. 1989).

Infrared Monitoring; Transmission & Distributon; vol. 41, No. 7 at 85 (Jul. 1989) (3 pages).

Infrared images stored on a floppy disk; Power; vol. 133, No. 5 at 99 (May 1989) (3 pages).

Encoder, decoder cover the video–resolution spectrum at p. 30; TMS320DSCx family, including TMS320DSC21 and TMS320DSC24 Texas Instruments, www.dspvillage.com at p. 96; EDN (Oct. 26, 2000) (3 pages).

CMOS sensors strive for CCD–like success; EDN at 26 (Dec. 7, 2000) (2 pages).

Providing Multicast Video on Demand Using Native–Mode Asynchronous Transfer Mode; J. W. Lockwood, et al; ISCAS '98; Proceedings of the 1998 IEEE Interantional Symposium on Circuits and Systems; vol. 4 of 6, pp. IV–53—IV–56 (May 31–Jun. 3, 1998).

A Single Chip Motion JPEG Codec LSI; S. Okada, et al; Proceedings of the IEEE Custom Integrated Circuits Conference; pp. 233–236 (May 5–8, 1997).

Transcoding GIF Images to JPEG–LS; N. Memon, et al.; Computer Science Department, Northern Illinois University (Jun. 13, 1997) (1 page).

Choosing the Right Computerised Maintenance Management System; Brian Hadley; Plaint Engineering and Maintenance; vol. 13, No. 8 at 42, 43, 48 (Sep. 1989) (5 pages).

Fuji and Toshiba Jointly Develops World's First Digital Still Camera; Video News, Still & Movie; Camerart (Dec. 1989).

Computers—Looking Beyond Maintenance; Plant Engineering and Maintenance; vol. 13, No. 8, pp. 51–53 (Sep. 1989).

Press on With a CMMS; Plant Engineering and Maintenance; vol. 13, No. 8, p. 59 (Sep. 1989).

Computerised Maintenance & Condition Base Monitoring; Plant Engineering and Maintenance; vol. 13, No. 8, p. 61 (Sep. 1989).

TIFF Background; Digital Optics Limited (1999–2002); http://www.digitaloptics.co.nz/technical/general/tiff.htm (4 pages).

Digicam and camcorder convergence; Tim Liebe; c/net Electronics; CNET Networks, Inc. (1955–2002); http://electronics.cnet.com/electronics/0–1629014–7–4572943.html (3 pages).

Sony DCR–TRV340, Digital8 camcorder with Memory Stick; Cruchfield New Media, LLC (1996–2002); crutchfield.com/S–XfK8ivFXyMf/cgi–bin/prodview:asp?i=158DCRV340!!mid... (3 pages).

Camcorders at Home; a Cybermedia Publication; http://www.pcquest.com/content/depth/102070417.asp (6 pages undated).

motion–JPEG; Jupitermedia Corporation (2002); http://www.webopedia.com/TERM/M/motion_JPEG.html (2 pages undated)).

Canon DV: Digital Video Camcorders: Elura 40MC; Canon U.S.A., Inc., http://www.canondv.com/elura40mc/index.html (1 page undated).

Moving JPEG/ The Free Online Dictionary of Computing (Dec. 15, 1996); http://burks.brighton.ac.uk/burks/foldoc/7/76.htm (1 page).

Motion JPEG; http://homepage.mac.com/blibbler/CODEC_discussion/MPEG.html (2 pages undated).

Motion JPEG; htt;://www.streamdemon.co.uk/mjpeg.html (1 page undated).

Cameras, Check out featured cameras on our Cameras page; Apple Computer, Inc. (2002); http://www.apple.com/quicktime/whyqt/ (4 pages).

Digital Camcorder; MV5iMC/MV5i, Introduction Feature Specification; http://www.canon.com.hk/english/products/digital_camcorder/mv5imc/product.htm (6 pages undated).

Minolta DiMAGE-7 Digital Camera; Hellocamera (1993–2002); http://www.hellocamera.com/mindimdigcam.html (4 pages).

Learn Mor About Codecs, What they are and what they can do for you; MainConcept AG (2002); http://www.mainactor.com/codecs/shtml (3 pages).

Olympus C–3020 3.2MP Digital Camera Pkg; http://www.bestpriceaudiovideo.com/product_detail.asp?Inventory–1441 (4 pages undated).

Fuji FinePix S602 Zoom Digital Camera; http://profeel.com/s602.htm (3 pages undated).

Digital Cameras, Olympus C–3020 Zoom; dbuys.com Inc. (2000–2001) http://www.dbuys.com/index.cfm?fuseaction=dby.proPage&Product_id=967 (8 pages).

Category: Panasonic; Berridge Mail (2002); http://www.berridgemail.co.uk/content.php?categoryId=168 (3 pages).

Canon Digital Camcorders; CamcordersPlus.com (2001–2002); http://www.camcordersplus.com/cannon.html (7 pages).

Digital Camcorders, Canon Elura 40 MC; http://www.mp-superstore.com/video/discr18495.htm (4 pages undated).

Multimedia and the Web, Lesson 3, Working with Images (2 Hours); http://www.outreach.psu.edu/Users/rak7/MM_Web/les3.html (5 pages undated).

Learning HTML, Chapter 5—Using Graphics and Colors; 5.1 Image Files; Paul Dempsey (2001); http://www.bsimple.org/learnhtml/chap5/1.html (3 pages).

Creating Animated GIFs . . . You don't need to be a genius!; Bev Sadler; Last update Nov. 1997; http://staff.csumb.edu/SadlerBev/world/animate2.htm (3 pages).

Model: Sony MVCF–D81; 501–62372 (Sep. 27, 1998) (1 page).

DSC–D700 Digital Still Camera Cyber–shot Pro; Sony Electronics Inc. (1998) (2 pages).

New Video & Audio Features, Digital Mavica; Sony Electronics, Inc. (1998) (8 pages).

Digital Mavica Camera; Sony Electronics, Inc. 91998) (6 pages).

Digital Mavica; Sony Electronics, Inc. (1998) (1 page).

The Future Starts Here., Memory Stick Media.; Sony (12 pages undated).

Sony, Digital Mavica; Sony Electronics, Inc. (2 pages undated).

Scanners—a clearer picture; 3D, EMAP Computing (UK) (Oct. 1989) (3 pages).

Two CAD Utilities Scan, Convert Drawings; InfoWorld (Jul. 24, 1989) (1 page).

Reaching Critical Mass; Personal Computing; VNU Business Publications (Sep. 1989) (8 pages).

Plotting the route from CAD to DTP; 3D, EMAP Computing (UK) (Apr. 1989) (3 pages).

Clip3D Library; PC Magazine, Ziff–Davis Publishing Company (Oct. 17, 1989) (3 pages).

Hotshot Presents: a back–to–basics approach to presentation graphics; PC Magazine; Ziff–Davis Publishing Company (Aug. 1989) (3 pages).

HotShot Presents is quick and easy; PC—Computing; Ziff–Davis Publishing Company (Oct. 1989) (2 pages).

Instant images; PC Magazine; Ziff–Davis Publishing Company (Oct. 17, 1989) (8 pages).

Arresting visions; PC User; EMAP (UK) (Oct. 25, 1999) (5 pages).

Change the Way You See the World, Memory Stick . . . ; Sony Electronics, Inc. (6 pages undated).

Infrared moves into utility staff hands; Electric Light & Power (Jul. 1989) (7 pages).

Digital Electronic Still Camera System; ITEJ Technical Report; vol. 13, No. 22, pp. 17–22; TEBS' 89–31 (Mar. 1989) (English translation attached).

How Sony Beat Digital Camera Rivals, Wall Street Journal, Jan. 25, 1999, B1.

The Still Video Picture; Still video cameras find uses even as the technology continues to improve; Phillip Robinson, Computer Graphics World, Feb. 1990 at p. 59.

Anyone can now afford to digitize images with the EDC–1000 digital camera from Electrim Corporation (article), News Release, p. 1, Oct. 15, 1988, http://www.dialogweb.com/cgi/dwclient?dwcommand=DWEB-PRINT%20621–1088113.

RC–250, http://www.canon.com/camera–muesum/camera/sv/data/1988_rc250_s.html.

Pentax, 1983, http://www.pentax.ru/store/listok_new/listok8.htm (seven page article in Russian).

A multispectral video imaging and analysis system, P. A. Frost; IN: High speed photography, videography, and photonics III; Proceedings of the Meeting, San Diego, CA, Aug. 22, 23, 1985 (A87–10969 01–35), Bellingham, WA, Society of Photo–Optical Instrumentation Engineers, 1985, Jan. 1985, (Abstract only) http://spie.o.../abstract.pl?bibcode=1985SPIE%2e%2e569%2e%2e%2e96F&page=1&qs.=spi.

A one–megapixel image acquisition and processing system for solar oscillation studies; Rhodes, Jr. et al., Edward J.; IN: Instrumentation in astronomy VI; Proceedings of the Meeting, Tucson, Az, Mar. 4–8, 1986; Part 1 (A87–36376 15–35), Bellingham, WA, Society of Photo–Optical Instrumentation Engineers, 1986, p. 256–267; Jan. 1986 (Abstract only); http://spie.org/.../abstract.pl?bibcode=1986SPIE%2e%2e627%2e%2e256R&page=1&qs=spi.

Optimized image data compression technique utilized in the Kodak SV9600 still–video transceiver; Majid Rabbani, et al.; Proc. SPIE vol. 1071, p. 246, Optical Sensors and Electronic Photography, Morley M. Blouke; Donald Pophai; Eds.; May 1989 (Abstract: not available);http://spie.org/scri.../abstract.pl?bibcode=1989SPIE%2e1071%2e%2e246R&page=1&qs=spi.

Development of button/head interface for still–video floppy recording; Gerald J. Kosarko et al.; Proc. SPIE vol. 1071, p. 294, Optical Sensors and Electronic Photography, Morley M. Blouke; Donald Phphal; Eds., May 1989 (Abstract: not available); http://spie.org/scri.../abstract.pl?bibcode= 1989SPIE%2e1071%2e%2e294K&page=1&qs=spi.

Digital information optical recording in pictorial format; A. A. Atkins; IN: Airborne reconnaissance III/Collection and exploitation of reconnaissance data/;Proceedings of the Seminar, Washington, D.C., Mar. 28, 29, 1978; (A79–17126 05–35) Bellingham, Wash., Society of Photo–Optical Instrumentation Engineers, 1978, p. 76–83; Jan. 1978 (Abstract only).

Digital processing of medical images for computer–aided diagnosis; Maryellen L. Giger et al.; Proc. SPIE vol. 1082, p. 25, Applications of Electronic Imaging, John C. Urgach; Ed., Aug. 1989 (Abstract: not available); http://spie.org/.../abstract.pl?bibcode= 1989SPIE%2e1082%2e%2e%2e25G&page=1&qs=spi.

Kodak SV9600 still–video transceiver; Keith A. Hadley; Proc. SPIE vol. 1071, p. 238, Optical Sensors and Electronic Photography, Morley M. Blouke; Donald Pophal; Eds., May 1989 (Abstract: not available); http://spie.org/scri.../abstract.pl?bibcode= 1989SPIE%2e1071%2e%2e238H&page=1&qs=spi.

Numerical optical data processor; S. A. Collins, Jr.; IN: Effective utilization of optics in radar systems; Proceedings of the Symposium, Huntsville, Ala., Sep. 27–29, 1977, (A79–15926 04–32) Bellingham, Wash., Society of Photo–Optical Instrumentation Engineers, 1977, p. 313–319; Jan. 1977 (Abstract only); http://spie.org/.../abstract.pl?bibcode= 1977SPIE%2e%2e128%2e%2e313C&page=1&qs=spi.

The LAE 980—A multipurpose digital image processing system; P. Colin et al.; IN: Applications of digital image processing III; Proceedings of the Seminar, San Diego, Calif., Aug. 27–29, 1979, (A80–39704 16–35) Bellingham, Wash., Society of Photo–Optical Instrumentation Engineers, 1979, p. 146–150; Jan. 1979 (Abstract only).

Thermovision 400 Series Operating Manual, by Agema Infrared Systems (1991).

Info–Mac Digest; Sat., Aug. 5, 1989, vol. 7 : Issue 137.

E–mail, Scott D. Kalter, re Canon Digitizing Camera, Jun. 11, 1989.

E–mail, Phil Stone, re Can on Digitizing Camera, Jun. 12, 1989.

E–mail, Kent D. Polk, re Canon Digitizing Camera, Jun. 12, 1989.

E–mail, Mike Shawaluk, re Canon Digitizing Camera, Jun. 13, 1989.

E–mail, Chiodo, re Canon Digitizing Camera, Jun. 15, 1989.

E–mail, John Ferguson, re Canon Digitizing Camera, Jun. 13, 1989.

Henning, Edward, Getting the Picture, PC User No. 120, Nov. 22, 1989 at 193 (ISSN 0263–5720).

Agema Infrared—Systems Thermovision® 400 Series Operating Manual.

Izawa F. et al., Digital Still Video Camera Using Semiconductor Memory Card, IEEE Transactions on Consumer Electronics, 36 (No. 1) Feb. 1990 at 1 (ISSS 0098–3063).

Sasaki, Minoru et al., Digial Electronic Still Camera System, 13 (No. 22) ITEJ Technical Report (Mar. 1989) at 17–22.

*Eikonix Introduces New Digital Camera Interface Support for Macintosh II, Ps/2, Targa, Truevista, and Colorboard 64*, Sep. 29, 1988 News Release, Atlanta, GA.

*Environments—What's New In Bitmap Formats: A Look At Windows and OS/2, 9* (No. 15) PC Magazine, Sep. 1990.

\* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *